United States Patent
Lee et al.

(10) Patent No.: US 8,619,994 B2
(45) Date of Patent: Dec. 31, 2013

(54) SYSTEM AND METHOD FOR PROVIDING DIGITAL CONTENTS SERVICE

(75) Inventors: Kyung Keun Lee, Daegu (KR); Byung Rae Lee, Seoul (KR); Seong Hun Bang, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 819 days.

(21) Appl. No.: 12/625,825

(22) Filed: Nov. 25, 2009

(65) Prior Publication Data

US 2010/0128878 A1    May 27, 2010

(30) Foreign Application Priority Data

Nov. 27, 2008   (KR) .................. 10-2008-0119010

(51) Int. Cl.
*G06F 21/00*     (2013.01)

(52) U.S. Cl.
USPC ............... 380/278; 713/194; 726/26; 726/28; 705/59; 380/200; 380/277; 380/281; 370/277; 370/278

(58) Field of Classification Search
USPC .................................. 370/277, 278; 380/278
See application file for complete search history.

(56) References Cited

U.S. PATENT DOCUMENTS

| | | | |
|---|---|---|---|
| 7,266,700 B2 * | 9/2007 | Tsutsui et al. ................. | 713/182 |
| 7,565,429 B1 * | 7/2009 | Fernandez .................... | 709/224 |
| 7,899,752 B2 * | 3/2011 | Lin et al. ........................ | 705/51 |
| 8,094,824 B2 * | 1/2012 | Hatano et al. ................. | 380/284 |
| 8,185,625 B2 * | 5/2012 | Fernandez .................... | 709/224 |
| 2002/0150244 A1 | 10/2002 | Kim et al. | |
| 2002/0170053 A1 * | 11/2002 | Peterka et al. .................. | 725/31 |
| 2002/0172366 A1 * | 11/2002 | Peterka et al. ................ | 380/277 |
| 2002/0172368 A1 * | 11/2002 | Peterka ........................ | 380/278 |
| 2002/0174366 A1 * | 11/2002 | Peterka et al. ................ | 713/201 |
| 2003/0154378 A1 | 8/2003 | Hirano | |
| 2004/0028226 A1 | 2/2004 | Saar et al. | |
| 2005/0071280 A1 * | 3/2005 | Irwin et al. ...................... | 705/59 |
| 2006/0095792 A1 * | 5/2006 | Hurtado et al. ............... | 713/189 |
| 2007/0174362 A1 * | 7/2007 | Pham et al. .................... | 707/204 |

(Continued)

FOREIGN PATENT DOCUMENTS

| | | | | |
|---|---|---|---|---|
| CN | 101115174 A | 1/2008 | | |
| KR | 2006-40489 | 5/2006 | ............. | G06F 17/00 |
| KR | 2008-27040 | 3/2008 | ............. | G06F 17/00 |
| KR | 2008-46515 | 5/2008 | ............. | G06F 15/00 |

OTHER PUBLICATIONS http://ieeexplore.ieee.org/stamp/stamp.jsp?tp=&arnumber=388205|A Consumption Model for firgeted Electronic Advertising|Rick Dedrick|1995|pp. 1-9.*

*Primary Examiner* — Mahfuzur Rahman
(74) *Attorney, Agent, or Firm* — Cha & Reiter, LLC

(57) ABSTRACT

The present invention relates to a method and system for providing a digital content service that provides packaging content consisting of digital rights management (DRM) content and advertisement content, and is able to use the DRM content for free by watching or listening to the advertisement content, including: generating packaging content consisting of pilot content and target content, which has been encrypted using an encryption key of the pilot content, and providing the packaging content to a portable terminal; and obtaining a decryption key for the target content through playing the pilot content of the packaging content, and playing the target content by the decryption key, by the portable terminal.

30 Claims, 11 Drawing Sheets

(56) References Cited

U.S. PATENT DOCUMENTS

| | | |
|---|---|---|
| 2008/0027864 A1 | 1/2008 | Lin et al. |
| 2008/0137848 A1* | 6/2008 | Kocher et al. ............... 380/201 |
| 2008/0267398 A1* | 10/2008 | Peterka et al. ............... 380/200 |
| 2009/0204541 A1* | 8/2009 | Zhuk et al. .................... 705/50 |
| 2009/0282432 A1* | 11/2009 | Hahnefeld et al. ............ 725/31 |
| 2010/0086133 A1* | 4/2010 | Asano et al. ................. 380/255 |

* cited by examiner

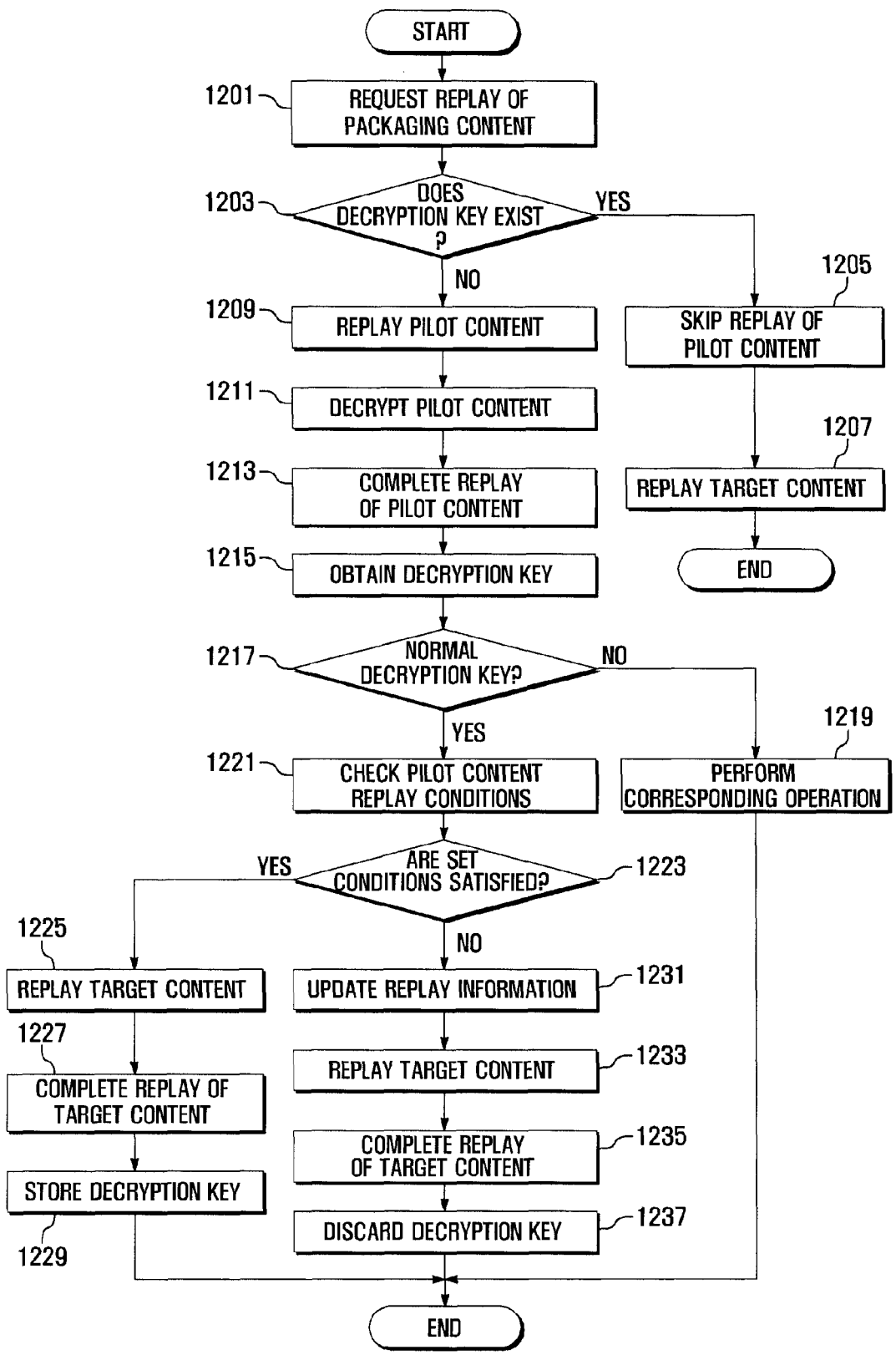

SYSTEM AND METHOD FOR PROVIDING DIGITAL CONTENTS SERVICE

CLAIM OF PRIORITY

This application claims the benefit of the earlier filing date, pursuant to 35 USC 119, to that patent application entitled "SYSTEM AND METHOD FOR PROVIDING DIGITAL CONTENT SERVICE" filed in the Korean Intellectual Property Office on Nov. 27, 2008 and assigned Serial No. 10-2008-0119010, the content of which are incorporated herein by reference.

BACKGROUND OF THE INVENTION

1. Field of the Invention

The present invention relates to a method and system for providing a digital content service, and more particularly, to a method and system for providing a digital content service which provides a packaging content consisting of digital rights management (DRM) content and advertisement content.

2. Description of the Related Art

In order to prevent an unauthorized copy or a redistribution of charged content used in a portable terminal or in similar type receiving systems, a technology referred to as digital rights management (hereinafter, 'DRM') has been suggested. The DRM is a technology capable of applying an encryption technology to various content, such as a document, a MP3 file, a ring tone, a moving picture, and a game or the like, to protect the rights of owner of the copyrighted content. Therefore, a content (hereinafter, a DRM content) that applies DRM technology exists with an all-time encrypted state, and only an authenticated user can decode and use a corresponding DRM content. That is, only a user who is authenticated by a specific license, referred to as a Right Object (hereinafter, 'RO'), for using the DRM contents can use a corresponding DRM content, so that unauthorized and/or illegal copies of the DRM content can be prevented. The RO is generated in a Right Object Issuing Server, referred to as RI (Right Issuer), and sold to users. By being separated from the DRM content and being stored in the portable terminal or other similar receiving type device, the RO can allow access to or restrict the execution of a corresponding DRM content. The RO can include a count mode, an interval mode, a timed-count mode, an accumulate mode or the like. The RO may include at least one constraint regarding access to the DRM content, wherein the constraint may stored in a specific field within the RO when the RO restricts the usage of the DRM content. For example, when purchasing a MP3 file which is set to execute a total 10 playing times, the 10 times constraint is set as an RO count mode. In this case, the count is decreased whenever the MP3 file is played. Then, when the count decreases to zero (0) as the MP3 file is played tenth, it is not possible to play the MP3 file any more. It is only possible to play the MP3 file when a new RO is purchased.

In the meantime, as described above, only the user who is authenticated by the purchase of the RO can execute the DRM content. Accordingly, a user has to make payment for the continued usage of the DRM content contained within the MP3 file. In addition, if the RO of a corresponding DRM content is expired, the DRM content is available only after renewing the RO. Accordingly, a user must pay the required fees or costs according to their usage of the DRM content.

SUMMARY OF THE INVENTION

The present invention further provides a method and system for providing a digital content service that provides a user with the use a DRM content without cost or fee The present invention further provides a method and device for a method and system for providing a digital content service that provides an advertisement content and a packaging contents consisting of a DRM content, and makes the DRM content available to a user for free after the user watches or listens to the advertisement content.

In accordance with an aspect of the present invention, a method of providing a content service includes: generating packaging content consisting of pilot content and target content that is encrypted using an encryption key of the pilot content, and providing the packaging content to a portable terminal by a packaging server; and obtaining a decryption key for the target content through playing the pilot content of the packaging content, and playing the target content by the decryption key.

Preferably, a method of providing a content service includes: selecting advertisement content to configure the packaging content and forming the content into data blocks having a preset number; allocating a milestone for each data block of the advertisement content; obtaining a partial key from each of the data blocks and the milestones, and generating an encryption key for target content using the partial key; generating target content based on a specific content using the encryption key; generating pilot content based on the advertisement content using a random public key for encryption (i.e., encryption key) of the advertisement content; and generating packaging content using the pilot content and the target content.

Preferably, a method of providing a content service includes: playing pilot content of the packaging content when the playing of the packaging content is requested; obtaining a partial key through decryption corresponding to encryption of the pilot content when playing the pilot content; generating a decryption key for target content using the partial key when the playing of the pilot content is completed; and playing the target content of the packaging content using the decryption key.

In accordance with another aspect of the present invention, a system for providing a content service includes: a packaging server which generates packaging content consisting of pilot content and target content encrypted using an encryption key of the pilot content, and provides the generated packaging content to a portable terminal; and a portable terminal which obtains a decryption key for the target content through the playing of the pilot content of the packaging content, and plays the target content by the decryption key if the decryption key is a normal decryption key generated by the normal playing of the pilot content.

BRIEF DESCRIPTION OF THE DRAWINGS

The above features and advantages of the present invention will be more apparent from the following detailed description in conjunction with the accompanying drawings, in which:

FIG. 12 is a flowchart illustrating a packaging content playing operation of a portable terminal according to an exemplary embodiment of the present invention.

DETAILED DESCRIPTION OF THE INVENTION

Figure 1:
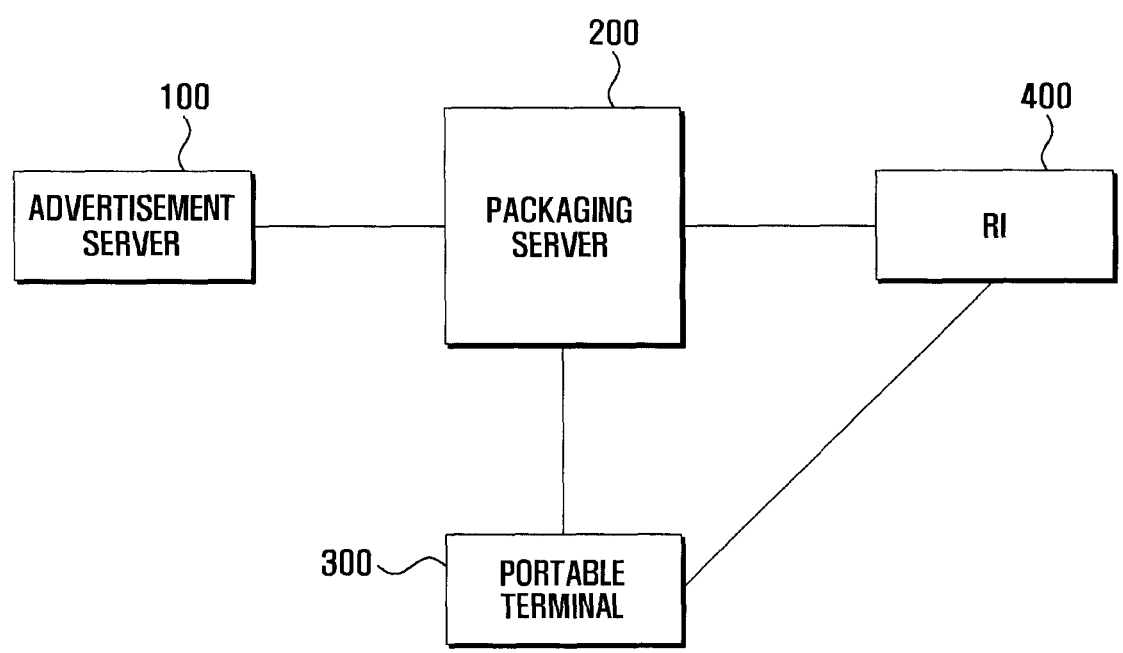
FIG. 1 is a block diagram illustrating a configuration of a system according to an exemplary embodiment of the present invention.

Exemplary embodiments of the present invention are described with reference to the accompanying drawings. The same reference numbers may be used throughout the drawings to refer to the same or like parts. For the purposes of clarity and simplicity, detailed descriptions of well-known functions and structures incorporated herein may be omitted to avoid obscuring the subject matter of the present invention.

This present invention relates to a method and apparatus for playing content (hereinafter, a DRM content) to which a digital rights management (DRM) technology is applied. Particularly, according to an exemplary embodiment of the present invention, it is classified into an advertisement content including image/audio data about a specific advertisement which is provided from an advertisement server, and a DRM content that is configured with the advertisement content and desired by a user to actually play. In the embodiment of the present invention, the advertisement content encrypted for the formation of an encryption key for the target content of the present invention is referred to as a pilot content, while the DRM content encrypted by the pilot content is referred to as a target content. Particularly, in the embodiment of the present invention, the pilot content refers to an advertisement content which is classified into at least one data block so as to generate a decryption key for the target content. Additionally, the content that provides the pilot content and the target content according to the embodiment of the present invention with a group is referred to as a packaging content. That is, the packaging content includes content consisting of the pilot content and the target content. A packaging server provides the packaging content consisting of the pilot content and the target content, while the portable terminal plays the pilot content which is included in the packaging content, so that the decryption key for the playing of the target content can be obtained. Thus, a user watches or listens to the pilot content, so that a target content can be used without cost or a fee.

Therefore, user can obtain a license, which is a decryption key of the target content, through the watching or listening to the advertisement. And thus, user can play the DRM content for free without extra cost for the playing of the DRM content. In conclusion, on the user's side, it is advantageous in that the cost according to the license purchase of the DRM content is reduced, while an advertizing effect can be enhanced in the advertiser's side. Additionally, a service provider can suggest a new business model to users and advertisers. Accordingly, the DRM content service can be enhanced and the DRM content service can be activated without the expenses of managing the ROs for hundreds and thousands of content.

Hereinafter, a system configuration according to an exemplary embodiment of the present invention and an operation according to an exemplary embodiment of the present invention in the system configuration will be illustrated with reference to FIG. 1 to FIG. 3.

FIG. 1 is a block diagram illustrating a schematic configuration of a system according to an exemplary embodiment of the present invention.

Referring to FIG. 1, the system according to an exemplary embodiment of the present invention can include an advertisement server 100, a packaging server 200, a portable terminal 300 and a RI (Rights Issuer) 400. The advertisement server 100 indicates a server which provides a specific advertisement, such as an advertisement content including advertisement data having at least one data type from among audio data (e.g. voice advertisement), audio/video data (moving picture/image advertisement), and text data (e.g. text advertisement). The advertisement server 100 can store at least one advertisement content, and can register the at least one advertisement content in the packaging server 200.

The packaging server 200 stores a normal content, a advertisement content, a pilot content, which is an encrypted advertisement content, a DRM content to which a DRM technology is applied, a target content, and a packaging content in which a pilot content and a target content are combined, into a database (DB). The packaging server 200 provides a pertinent content corresponding to the request of the portable terminal 300. Additionally, the packaging server 200 can store a license corresponding to a pilot content, or can request the generation of a license for the pilot content to the RI 400. The packaging server 200 obtains an advertisement content in connection with the advertisement server 100, and can generate a pilot content based on an encryption of the advertisement content, which is described in further detail later, and can store the pilot content. The packaging server 200 generates an encryption key associated with the pilot content, and can encrypt the target content by the encryption key.

The packaging server 200 transmits the packaging content previously generated and stored in response to the request of the portable terminal 300, or can transmit after generating the packaging content by using the pilot content and the target content corresponding to the request of the portable terminal 300. In the embodiment of the present invention, it is assumed that the packaging content applies the DRM technology. The applying of the DRM technology means that the packaging content is encrypted by using an encryption key and encryption type which are previously defined. The packaging server 200 can generate the packaging content while including a public-key, which is a license for the playing of the pilot content, in configuring the packaging content.

Alternatively, when transmitting the packaging content to the portable terminal 300, the packaging server 200 requests the RI 400 to generate a license for the pilot content of the packaging content so that the RI 400 can transmit the license for the pilot content to the portable terminal 300. Additionally, the packaging server 200 can omit the operation relating to a license in the transmission of the packaging content, and can leave an authority for license acquisition in the hands of the portable terminal 300. The portable terminal 300 connects to the packaging server 200 and receives a content corresponding to a user's request. At this time, the received content can be one from among the packaging content, the advertisement content, the target content (DRM content) and a normal content.

Particularly, the portable terminal 300 preferentially can perform the playing of the pilot content in the playing of the packaging content. The portable terminal 300 can play the pilot content by decoding through a license of the pilot content. At this time, in the decoding of the pilot content, the portable terminal can obtain a decryption key for decoding of the target content; that is, a license for the target content. The portable terminal 300 can play a target content by the decryption key obtained from the playing of the pilot content. The portable terminal 300 obtains the license of the pilot content without pay, and can obtain a license about the pilot content in association with the packaging server 200 or the RI 400. The portable terminal 300 can determine the normality of the decryption key before the playing of the target content by the obtained decryption key. That is, it is determined whether the decryption key is generated by an illegal behavior of the user. Depending on the result of the determination, it can be determined whether the target content is played. Moreover, if the obtained decryption key is abnormal, the portable terminal 300 can determine whether the reason of the abnormality is a problem of the pilot content itself (data loss or the like) or a problem of illegal behavior of the user. In case it is a problem of the pilot content, the procedure for the restoring of a corresponding pilot content can be executed. The restoring can be a procedure of downloading another pilot content that is identical with the pilot content from the packaging server 200.

The RI 400 can be a server that manages each license for the pilot content and the target content (DRM content). The license is a registration certificate, which gives a permission for accessing the encrypted content through the DRM technology, can include a decryption key that is used to decode a corresponding content and an usage limitation information. Therefore, only when being endowed with a license (public key, encryption/decryption key) defined in a DRM system, the portable terminal 300 can play the content to which the DRM technology is applied.

The RI 400 authenticates whether the user of the portable terminal 300 requesting the acquisition of a license is a legitimate user of a corresponding content. In case of a legitimate user, the RI 400 generates a license for the content to which the DRM technology is applied and transmits the license to the portable terminal 300. At this time, the license contains a decryption key of a corresponding content and an usage limitation information. In an embodiment of the present invention, the license can be classified into a "no charge license" (public key) for the playing of a pilot content, and a "charge license" for the playing of a target content (DRM content). Particularly, in the embodiment of the present invention, the charge license of the target content can be replaced with a license generated by the playing of the pilot content.

In the above, a system configuration according to an exemplary embodiment of the present invention was schematically illustrated. Hereinafter, in the system configuration of FIG. 1, a signaling among the advertisement server 100, the packaging server 200, the portable terminal 300 and the RI 400 is illustrated with reference to FIG. 2 and FIG. 3. However, each configuration of the system of the present invention is not limited to the exemplary embodiment which is described in detail below. Therefore, it should be noted that it can be applied to various embodiments based on above and below exemplary embodiment.

Figure 2:
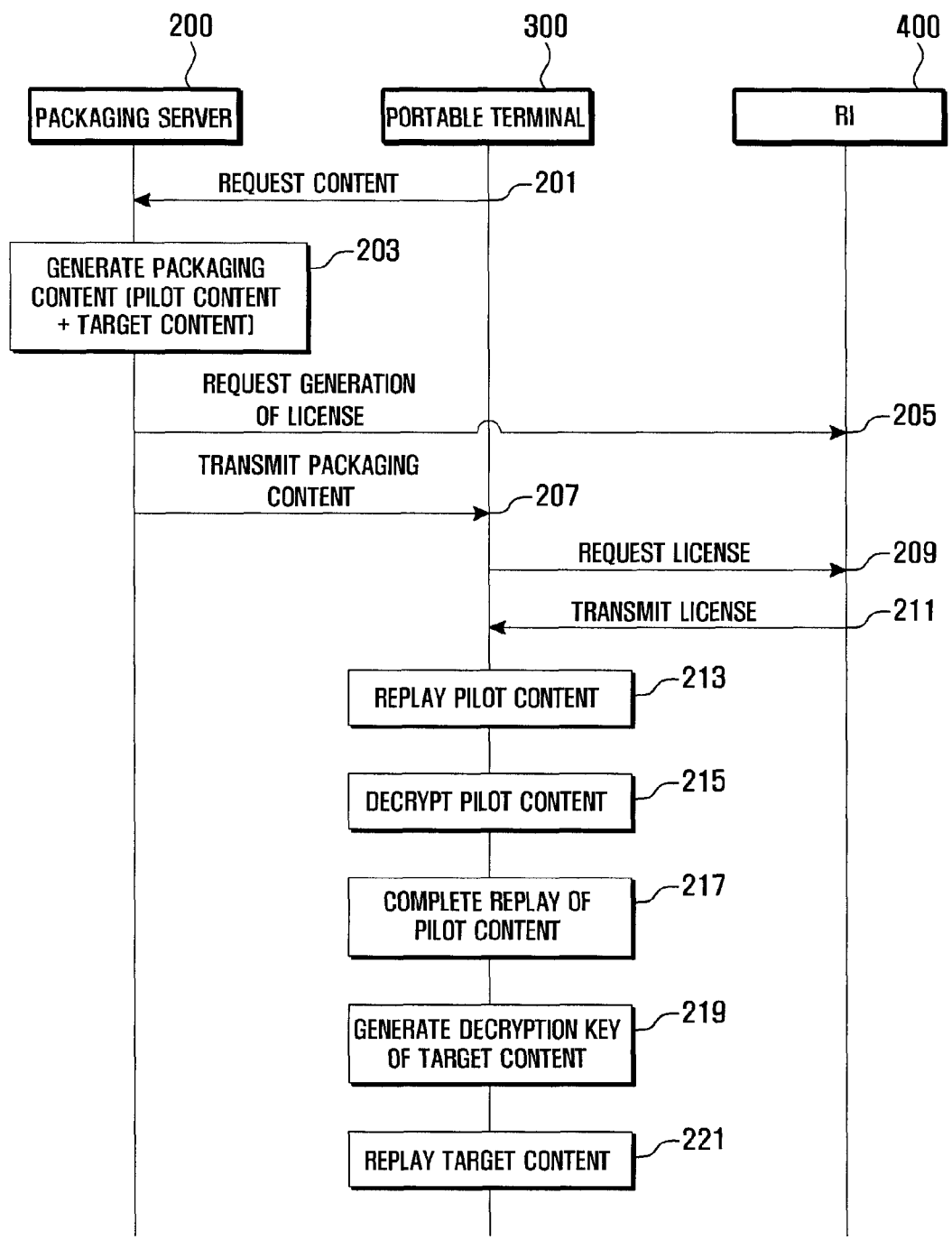
FIGS. 2 and 3 are drawings illustrating a content service providing method according to an exemplary embodiment of the present invention.

FIG. 2 is a drawing illustrating a content service providing method according to an exemplary embodiment of the present invention.

Referring to FIGS. 1 and 2, the portable terminal 300 connects to the packaging server 200 and can request the acquisition of content from the packaging server 200 (201). The packaging server 200 extracts or generates a packaging content corresponding to the request of the portable terminal 200 (203).

Here, the extraction or generation of packaging content means the extraction of preconfigured packaging content corresponding to the request of the portable terminal 300, or the generation of the packaging content that unites the target content and the pilot content corresponding to the request of the portable terminal 300, or the generation of the packaging content that randomly extracts an arbitrary pilot content and unites it with the target content corresponding to the request of the portable terminal 300. At this time, when the portable terminal 300 requests a content due to the designation of a specific advertisement content, the packaging server can encrypt the specific advertisement content into the pilot content. The encryption of the pilot content will be described later.

Then, when the packaging server 200 transmits the packaging content to the portable terminal 300, the packaging server 200 can transmit a message requesting the generation of license for the pilot content of the packaging content to the RI 400 (205). And then, the RI 400 generates a license for the pilot content, transmits the license to a corresponding portable terminal 300 according to a system configuration, or can stand by the request of the license acquisition of the portable terminal 300. Then, the packaging server 200 transmits the generated packaging content to the portable terminal 300 (207). If the portable terminal 300 receives the packaging content from the packaging server 200, the portable terminal 300 requests a license for the playing of the received packaging content, particularly, the playing of the pilot content within the packaging content, to the RI 400 (209). And then, the RI 400 transmits the requested license to the portable terminal 300, in response to the request of the portable terminal 300 (211). The license can be a no charge license used for the decoding of the pilot content, e.g., a public key. The public key can correspond to a specific encryption key used in the encrypting of the pilot content. When executing the playing of the packaging content in response to the user's request, the portable terminal 300 can firstly execute the playing of the pilot content of the packaging content (213). At this time, the portable terminal 300 can perform the playing of the pilot content, by using the license (public key) received from the RI 400. Here, the portable terminal 300 can obtain a decryption key for the decoding of the target content by the playing of the pilot content. That is, in the process of decoding according to the playing of the pilot content (215), the portable terminal 300 can obtain and buffer partial keys from respective data blocks configuring the pilot content and milestones allocated to the data blocks.

A partial key is a temporal key obtained through a data block configuring the pilot content and a milestone mapped to it, indicating a temporal key generating in the decoding of the pilot content for the derivation of decryption key for the target content. That is, the partial key can be obtained corresponding to the number of data blocks (or, the number of milestones) decoded among data blocks configuring the pilot content. If the number of data block configuring the pilot content is n, and when the whole playing of the pilot content is completed, that is, when n data blocks are decoded, in response to that, n partial keys can be generated. Thereafter, by making use of partial keys obtained according to the decoding of the pilot content, the final decryption key for the decoding of the target content can be obtained. The detailed description will be described later.

If the playing of the pilot content is completed (217), the portable terminal 300 obtains a decryption key for the playing of the target content of the packaging content by using partial keys that are generated according to the decoding of the pilot content (219). The decryption key corresponds to an encryption key that was used in the encryption of the target content in the packaging server 200. The detailed description of a method for acquiring the encryption key and the decryption key according to an exemplary embodiment of the present invention will be described later. Then, the portable terminal 300 decodes the target content by the obtained decryption key and performs the playing of the target content (221).

In the above, the process where the portable terminal 300 downloads and plays a packaging content configured in the packaging server 200 was illustrated. Hereinafter, the process where the packaging server 200 configures a packaging content with a specific target content after obtaining a specific advertisement content and encrypting into a pilot content and transmits to the portable terminal 300 is illustrated with reference to FIG. 3.

Figure 3:
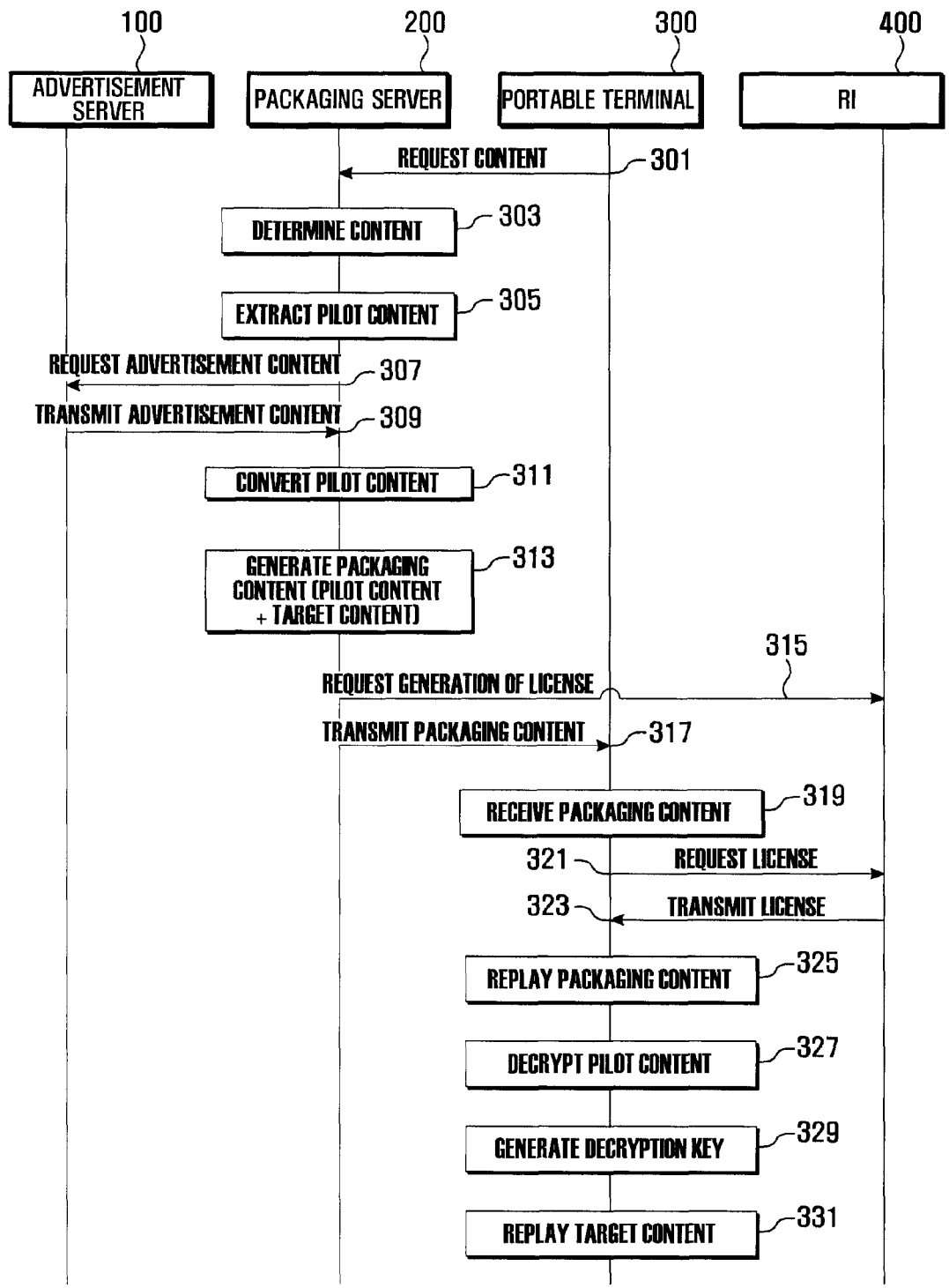

FIG. 3 is a drawing illustrating a content service providing method according to an exemplary embodiment of the present invention.

Referring to FIG. 3, the portable terminal 300 connects to the packaging server 200 providing a corresponding packaging content for the acquisition of packaging content, in response to the user's request, and can request the acquisition of packaging content to the packaging server 200 (301). The packaging server 200 then configures a packaging content corresponding to the request of the portable terminal 200. That is, the packaging server 200 determines a pilot content, which the portable terminal 200 requests (303), and extracts the pilot content registered in the packaging server 200 (305). When the requested pilot content does not exist, the packaging server 200 can request of the advertisement server 100 (307) an advertisement content corresponding to the pilot content. The advertisement server 100, in response to the request, extracts a corresponding advertisement content and transmits the extracted advertisement content to the packaging server 200 (309). The packaging server 200 can perform a procedure of conversion comprising at least encrypting the obtained advertisement content into the pilot content (311).

The encryption of the pilot content can be performed by a license (public key) that may be designated in a known manner or may be designated in a random manner. The encryption of the pilot content will be described later. Although not shown in FIG. 3, the packaging server 200 can further perform the process of storing the obtained advertisement content and the converted advertisement content (i.e., pilot content).

The packaging server 200 next generates a packaging content while including the pilot content and the target content corresponding to the request of the portable terminal 300 (313). At this time, depending on the setting type, the packaging content can be configured with one or two data formats. And, in the embodiment of the present invention, it is exemplified that the packaging content is configured with one data format. This data format will be described later.

The packaging server 200 next transmits a message requesting the generation of a license for the pilot content of the packaging content to the RI 400 (315). The RI 400, in response to license request, generates a license for the pilot content, transmits the license to a corresponding portable terminal 300 or can be waiting to receive the request of the license acquisition of the portable terminal 300 according to a system configuration. The packaging server 200 then transmits the generated packaging content to the portable terminal 300 (317). After the portable terminal 300 receives the packaging content from the packaging server 200 (319), the portable terminal 300 may request a license for the playing of the received packaging content, particularly, the playing of the pilot content within the packaging content. In this case, a request for license may be sent to the RI 400 (321). The RI 400 then transmits the requested license to the portable terminal 300, in response to the request of the portable terminal 300 (323). The license can be no charge license used for the decoding of the pilot content, that is, a public key. The public key can correspond to a specific encryption key used in the encrypting of the pilot content. When executing the playing of the packaging content in response to the user's request, the portable terminal 300 can first execute the playing of the pilot content of the packaging content (325). After receiving the license, the portable terminal 300 can perform the playing of the pilot content, by using the license received from the RI 400.

The portable terminal 300 can obtain a decryption key for the decoding of the target content by the playing of the pilot content. That is, in the process of decoding according to the playing of the pilot content (327), the portable terminal 300 can obtain and buffer partial keys from respective data blocks configuring the decoding pilot content and milestones allocated to the data blocks. The description of the partial key corresponds to the description illustrated in a corresponding description part with reference to FIG. 2. If the playing of the pilot content is completed, the portable terminal 300 obtains a decryption key for the playing of the target content of the packaging content by using partial keys that are generated according to the decoding of the pilot content (329).

The decryption key corresponds to an encryption key that was used in the encryption of the target content by the packaging server 200. The encryption key can be an encryption key generated according to the encryption of the pilot content. The detailed description of a method for acquiring the encryption key and the decryption key according to an exemplary embodiment of the present invention will be described later. The portable terminal 300 decodes the target content by the obtained decryption key and is, thus, able to play the target content (331).

In the above, the system configuration of the present invention and an operation flow among each element were illustrated with reference to FIGS. 1 to FIG. 3. Hereinafter, a detailed operation of the packaging server according to the present invention is illustrated with reference to FIGS. 4 to FIG. 8. However, the operation of the present invention is not limited to an exemplary embodiment which is described herein as it would be with the knowledge of those skilled in the art to modify the processing described without altering the scope of the invention. Therefore, it should be noted that it can be applied to various embodiments based on the below exemplary embodiment.

Figure 4:
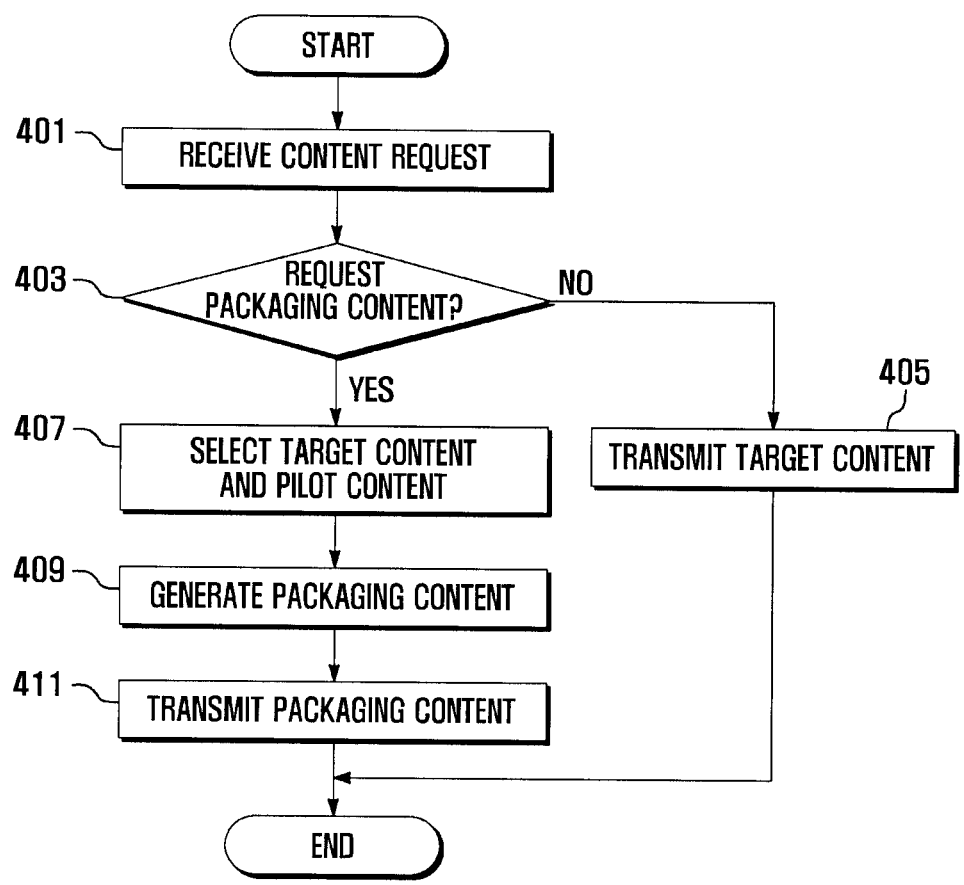
FIGS. 4 and 5 are flowcharts illustrating a processing operation of a packaging server according to an exemplary embodiment of the present invention.

FIG. 4 is a flowchart illustrating a processing operation of a packaging server according to an exemplary embodiment of the present invention.

FIG. 4 illustrates an example of operation in which a user directly selects a target content and a pilot content for configuring a packaging content, and the packaging server generates the packaging content in response to the user's selection.

Referring to FIG. 4, when the packaging server receives a request regarding a specific content from a specific portable terminal (401), the server determines whether the requested specific content is a packaging content or a normal DRM content, i.e., a target content (403). At this time, although it is omitted in the description of FIG. 4, it should be noted that the packaging server can perform a processing of a normal content to which the DRM technology is not applied in response to the request of the portable terminal.

As a result of the determination, if the content requested by the portable terminal is a target content, the packaging server extracts a corresponding target content requested by the portable terminal and transmits the extracted target content to the portable terminal (405). As a result of the determination, if the requested content is a packaging content, the packaging server selects a target content and a pilot content requested by the portable terminal (407), generates a packaging content by the combining of the selected target content and pilot content and a set encryption process (409). That is, a packaging content corresponding to the user's request is generated. The packaging server transmits the generated packaging content to the portable terminal (411). At this time, the packaging server can also transmit a message to RI requesting the generation of a license for decoding the pilot content.

FIG. 4 illustrates an example of a case where a user directly configures a packaging content. That is, the target content and the pilot content contained with a packaging content are directly selected by the user, and the packaging server configures a packaging content by using the target content and the pilot content selected by the user. Therefore, when the user requests a specific packaging content from the packaging server, if the content which the portable terminal requests is a packaging content at step 403, the packaging server extracts the requested pertinent packaging content and immediately transmits the extracted packaging content to the portable terminal.

Figure 5:
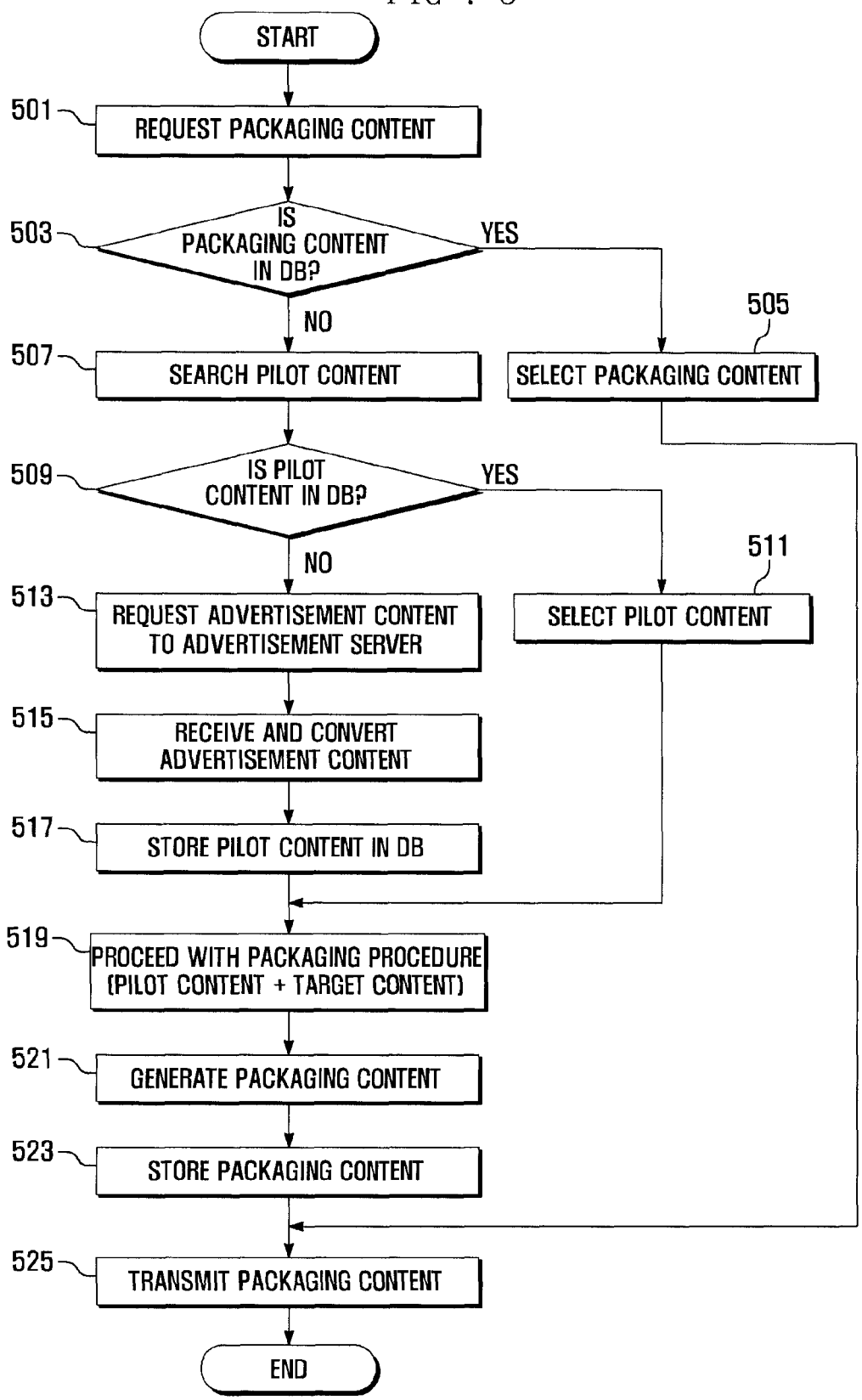

FIG. 5 is a flowchart illustrating a processing operation of a packaging server according to an exemplary embodiment of the present invention.

FIG. 5 illustrates an example of operation of configuring a packaging content by using a target content and a pilot content, after a packaging server obtains an advertisement content and converts it into the pilot content in association with an advertisement server.

Referring to FIG. 5, if the packaging server receives a request regarding a specific packaging content from a portable terminal (501), it can check whether the requested packaging content exists in the database (DB) (503). Here, the request about the packaging content can be a case of designating a target content which the user desires and, thereafter, of requesting a method of acquisition of the target content as a method of acquisition by the packaging content. If the requested packaging content exists in the data base (DB), the packaging server selects a corresponding packaging content (505), and transmits the selected packaging content to the portable terminal (525). On the other hand, if a preconfigured packaging content does not exist in the DB of the packaging server, the packaging server performs a search about a pilot content which is to configure the packaging content with the target content according to the user's request (507), and can check whether a certain pilot content exists in the DB (509).

As a result of the checking, if the pilot content exists, the packaging server selects the pilot content (511), performs a packaging procedure for the generation of the packaging content by using the target content according to the user's request and the selected pilot content (519). The packaging procedure can include an encryption procedure for generating an encryption key for the target content by using the pilot content, and generating a decryption key for the target content corresponding to the encryption key. The detailed description about this will be described later.

As a result of the checking, if the pilot content does not exist, the packaging server requests a specific advertisement content that will configure a packaging content in association with the advertisement server (513). Then, the packaging server converts the advertisement content obtained from the advertisement server into a pilot content (515). In the pilot content conversion, an encryption can be processed by a license (public key) that is randomly designated, and the pilot content conversion will be described later. The packaging server can store the advertisement content and the converted advertisement content (i.e., pilot content) into the DB (517).

The packaging server can perform a packaging procedure for the generation of packaging content by using the target content according to the user's request and the pilot content (519). That is, the packaging server performs the combining of the pilot content and the target content and a set encryption procedure. Then, the packaging server generates a packaging content by the packaging procedure (521), stores the generated packaging content into the DB (523). The packaging server transmits the packaging content to the portable terminal in response to the request of the portable terminal (525). At this time, the packaging server can transmit a message requesting the generation of a license about the pilot content to RI.

Figure 6:
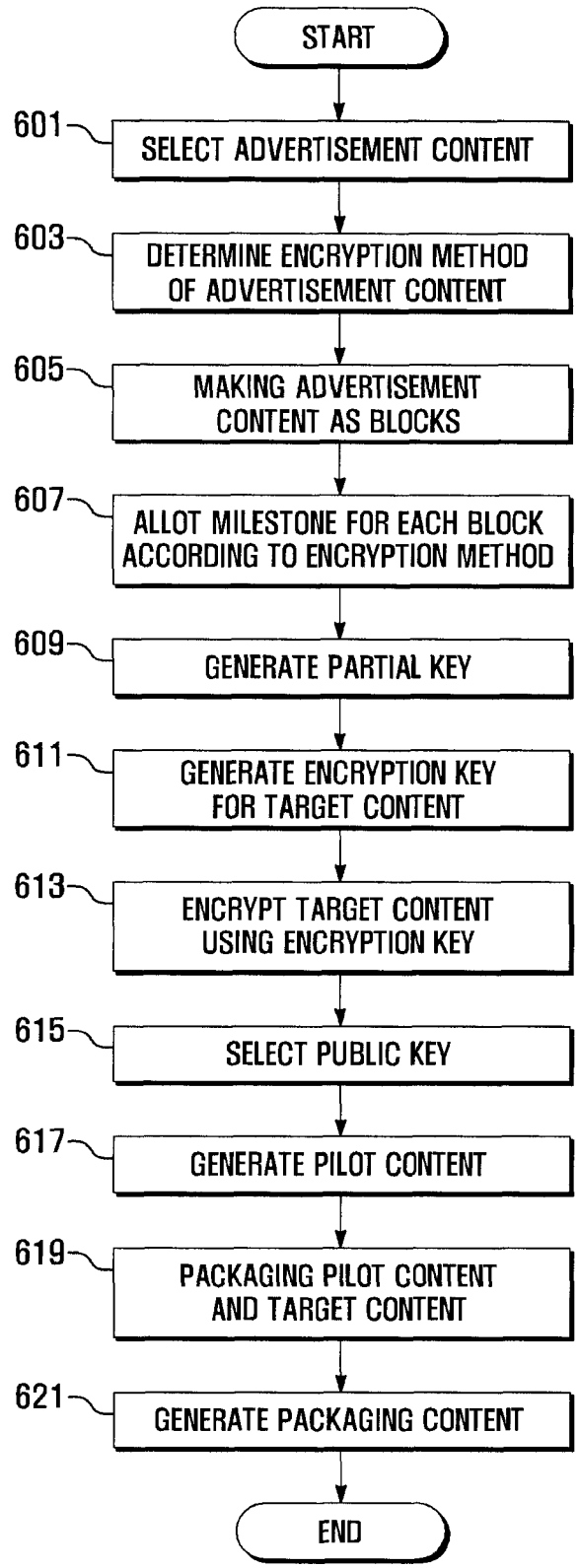
FIG. 6 is a flowchart illustrating a packaging content generation procedure of a packaging server according to an exemplary embodiment of the present invention.

FIG. 6 is a flowchart illustrating a packaging content generation procedure of a packaging server according to an exemplary embodiment of the present invention. FIG. 6 is a drawing illustrating a procedure of encrypting a target content by using a pilot content, in the generation of packaging content as described above in the description part referring to the above-described FIGS. 1 to 5.

Referring to FIG. 6, the packaging server selects an advertisement content configuring a packaging content (601). At this time, the advertisement content can be a pilot content that is applied according to an embodiment of the present invention, or a normal advertisement content that is not encrypted. Additionally, the advertisement content can be a content previously stored in the DB of the packaging server, or a content received from the advertisement server and stored. Moreover, the advertisement content can be a content designated by user, or a content that the packaging server arbitrarily designates by a random selection. The packaging server determines an encryption type of the advertisement content (603). Here, the encryption type according to an exemplary embodiment of the present invention can be classified into two types. That is, according to an exemplary embodiment of the present invention, according to the whole playing or the part playing of the pilot content, a decryption key for the target content can be obtained. That is, a user can obtain the decryption key for target content in case of the watching or listening to the whole or part of the pilot content. Accordingly the encryption type of the present invention can be classified into an all or nothing type which obtains a decryption key for target content requiring playing the whole pilot content, and a threshold type which obtains a decryption key for the target content requiring playing a part of the pilot content.

That is, the all or nothing type means a type which generates a decryption key for playing a target content only when playing the whole pilot content. The threshold type means a type that generates a decryption key for playing a target content when playing a part of the pilot content. In the threshold type, for example, when data block configuring the pilot content is n, if the decryption of data block over t among n data block is performed, the decryption key for the target content can be obtained. A detail encryption type for the all or nothing type and the threshold type will be described later.

If one encryption type among the all or nothing type and the threshold type is determined, the packaging server makes the advertisement content to be a block type (605). That is, the packaging server classifies the advertisement content into data blocks having a preset number (e.g., n, when n is a natural number). The packaging server assigns milestone by each data block of the advertisement content according to the determined encryption type.

Figure 7:
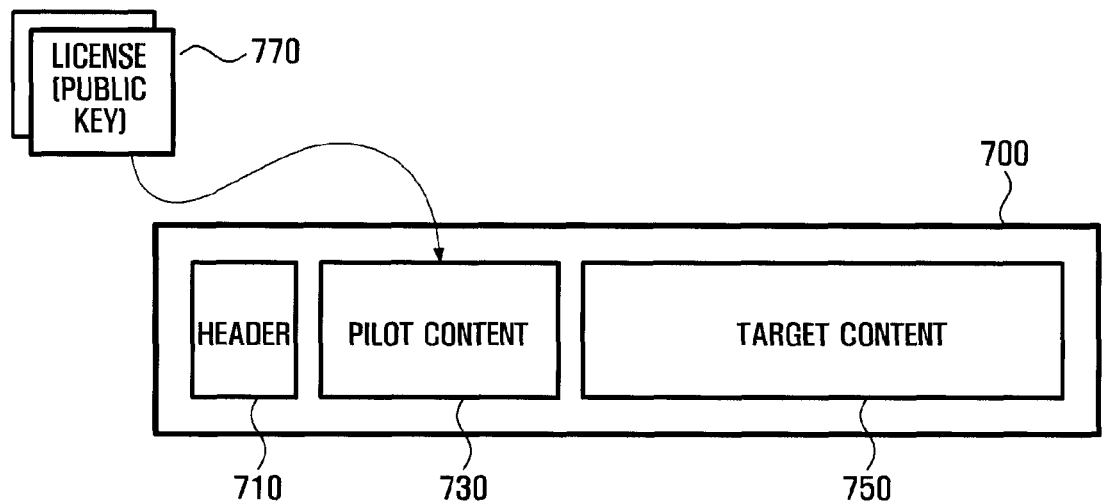
FIG. 7 is a drawing illustrating an example of a format of packaging content according to an exemplary embodiment of the present invention.

The milestone is an additional information included in the pilot content, and is allocated to prevent the behavior such as intentional fast forward of user. The packaging server next generates and stores a partial key from the milestone allocated by each data block (609). The packaging server generates a first encryption key for target content by the partial key (611), and encrypts the target content by making use of the first encryption key (613). That is, the packaging server encrypts a specific DRM content according to the user's option by the first encryption key, so that it can generate the target content that is used in developing the packaging content. Then, the packaging server selects a second encryption key (public key) for the encryption of the advertisement content in which a milestone is allocated by each data block (615). The packaging server encrypts the advertisement content by the second encryption key and generates a pilot content (617). The packaging server performs a packaging of the pilot content and the target content (619), and generates a packaging content of the present invention (621). FIG. 7 is a drawing illustrating an example of a format of packaging content according to an exemplary embodiment of the present invention.

Referring to FIG. 7, the packaging content 700 according to an exemplary embodiment of the present invention can be classified into a header 710, a pilot content 730 and a target content 750. The header 710 can include an identification information which indicates that the content is a packaging content, and an information which determines whether the packaging content is obtained by the all or nothing type or the threshold type encryption method previously described. Additionally, the header 710 can include information regarding the playing of the pilot content 730 in the playing of the packaging content and an address information of a server (e.g. packaging server, RI or the like) from which a user can obtain a license 770 for the playing of the pilot content 730. The license 770 can be a no charge license used for the decoding of the pilot content, e.g., a public key. The public key can correspond to a specific encryption key used in the encrypting of the pilot content. The public key that may be used to do both encryption and decryption, as will be understood by those skilled in the art. The address information can be a uniform resource location (URL) address of a corresponding server. Accordingly, the portable terminal can select a server capable of obtaining the public key (license) 770 of the pilot content, for the playing of the pilot content 730 through a web browsing to URL of the selected server. As shown in FIG. 7, according to an exemplary embodiment of the present invention, the pilot content 730 is decoded by the public key 770, which may be a no charge license. Additionally, the target content 750 is decoded by a decryption key generated according to the playing of the pilot content 730. Hereinafter, the encryption of the pilot content and target content of the present invention is presented in further detail.

Figure 8:
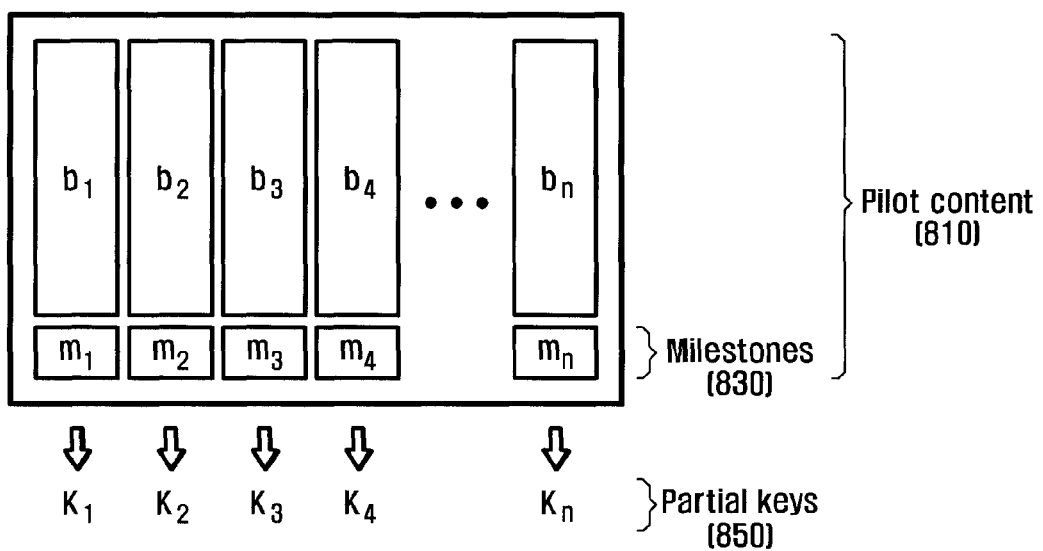
FIG. 8 is a drawing illustrating a pilot content configuration according to an exemplary embodiment of the present invention and the description of encryption operation of a target content using the pilot content.

FIG. 8 is a drawing illustrating a pilot content configuration according to an exemplary embodiment of the present invention and the description of an encryption operation of a target content using the pilot content. Hereinafter, the operation according to the all or nothing type and the threshold type of the present invention is illustrated. The packaging content generation operation according to the all or nothing type encryption is illustrated with reference to FIG. 8.

Referring to FIG. 8, as shown in FIG. 8, the packaging server divides an advertisement content into an arbitrary number of data blocks $b_1$ to $b_n$. It is assumed that the set number is n (n is a natural number).

The packaging server selects milestones $m_1$ to $m_n$ 830 to be assigned to each data block $b_1$ to $b_n$ of the advertisement content. Here, the number of the selected milestones $m_1$ to $m_n$ 830 can correspond to the number (n) of data block $b_1$ to $b_n$ classifying the advertisement content. Moreover, it can be assumed that the size of the milestones $m_1$ to $m_n$ 830 assigned for each data block $b_1$ to $b_n$ is 128 bit. However, the number of milestones and the size of milestones is not limitative and the number and size can be varied with altering the scope of the invention. The packaging server randomly assigns the milestones $m_1$ to $m_n$ 830 to each data block $b_1$ to $b_n$ of the advertisement content. In FIG. 8, it is illustrated that the milestones $m_1$ to $m_n$ are successively allocated. However, the present invention is not limitative and the milestones $m_1$ to $m_n$ can be randomly allocated according to an arbitrary order.

The packaging server calculates a partial key ($K_1$ to $K_n$) 850 from each data block $b_1$ to $b_n$ of the advertisement content, and milestones $m_1$ to $m_n$ 830 allocated to each data block $b_1$ to $b_n$. The partial keys $K_1$ to $K_n$ 850 can be a temporary key generated for the final key for the encoding of the target content, that is, the decryption key derivation for the target content in the encoding of the pilot content. The partial keys may be obtained in a manner that corresponds to the number of data blocks $b_1$ to $b_n$ configuring the pilot content or the number of milestones $m_1$ to $m_n$ that are allocated to data blocks $b_1$ to $b_n$. If the number of data blocks configuring the pilot content is n, the number of the obtained partial keys can also be n.

That is, the partial keys can be calculated using the data blocks and milestones as shown in the following Equation 1.

$$K_i = \text{Hash}_1(b_i) \oplus m_i \ (1 \leq i \leq n) \tag{1}$$

where $K_i$ represents partial keys calculated from arbitrary data block ($b_i$) and arbitrary milestone ($m_i$), $b_i$ represents the arbitrary data blocks;

$m_i$ represents arbitrary milestones; and

Hash represents a cryptographic hash function, and $\text{Hash}_1$ represents a hash function used for compressing the $i^{th}$ data block of advertisement content.

Here, the hash function represents a function that inputs a bit string of an arbitrary length, and outputs a random bit string of a known length. The hash function is an algorithm that makes it impossible to predict the input value from a known output value or that is designed to make it impossible to calculate different input values with the same output. Many algorithms have been designed as an algorithm used for the hash function. SHA-1 algorithm, the US federal standards algorithm, is most widely used in products, and MD5 algorithm of RSA, RIPEDMD which is European standards algorithm, and HAS-160 which is Korean standards algorithm are also widely known and need not be discussed in detail herein.

The packaging server next generates encryption keys for the target content from each partial key $K_1$ to $K_n$ that are calculated by Equation 1. The encryption key for the target content can be generated according to the following Equation 2.

$$CEK_t = \text{Hash}_2(K_1, K_2, \ldots, K_n) \tag{2}$$

where, $CEK_t$ represents an encryption key for encrypting the target content, $K_1$ to $K_n$ represent each partial key calculated by Equation 1, $\text{Hash}_2$ represents a hash function used to generate an encryption key for the target content.

The packaging server encrypts the target content using the encryption key (CEK$_t$) for the target content produced according to Equation 2. Here, the process of encrypting the target content using the encryption key may be performed according to the standards (e.g., OMA-DRM 2×).

The packaging server randomly selects the encryption key (CEK$_p$) for the pilot content to encrypt the advertisement content. The encryption key (CEK$_p$) for the pilot content may generally be a publically available key having a 128 bit string. The packaging server then encrypts the advertisement content as the encryption key (CEK$_p$) for the pilot content, and generates the pilot content 810. The process of encrypting the advertisement content using the encryption key (CEK$_p$) for the pilot content can be performed according to the well-known standards (e.g., OMA-DRM 2×).

The packaging server next generates packaging content as shown in FIG. 7 using the pilot content and the target content. Further, the packaging server can additionally encrypt the encryption key (CEK$_p$) for the pilot content using the public key of a portable terminal (i.e., Public/Private key encoding), and can generate the final license value for the packaging content including the encryption key (CEK$_p$) for the pilot content and the additional information. The encryption process using the publically available key may be performed according to the standards (e.g., OMA-DRM 2×), and the additional information may represent information such as permissions and constraints.

Until now, packaging content generation operation has been considered according to the all-or-nothing method of the present invention. In another aspect of the invention, the operation of generating packaging content according to the threshold method will be explained in the following reference to FIG. 8.

Referring to FIG. 8, the threshold method represents a method in which decryption, i.e., playing of the target content is possible when partial keys according to a number of milestones more than a known number (e.g. t) are obtained in case a total of n milestones are defined. That is, when compared with the all-or-nothing method, if partial key values associated with at least t data blocks among n data blocks (milestones) are obtained, the encryption key (CEK$_t$) for the target content can be obtained.

Thus, the packaging server can generate a parameter used in the threshold method as follows.

More specifically, the packaging server can define the total number of milestones (n), a random prime number (p) for polynomial expression f(x) and the number of milestones to be minimum decrypted according to the threshold method (t), respectively.

First, the packaging server determines the total number (n) of milestones to be allocated to each data block $b_1$ to $b_n$ of the advertisement content. The total number of the milestones may be the number of the data blocks $b_1$ to $b_n$ or less. Hereinafter, it is assumed that the number of the milestones is n as shown in FIG. 8.

The packaging server randomly generates the coefficient (a0) of f(x) based on Galois field (GF(p)). The coefficient (a0) is a natural number.

Here, the Galois field (GF(p)) represents a finite field defined in abstract algebra or field theory. GF(p) is used for cryptology and coding theory because of its mathematically special features. The GF(p) is a finite field with p elements. Here, "p" is a prime number. Generally, "field" is defined as a numeration system that can freely perform the four fundamental arithmetic operations, and among them, only the fields whose number of elements is finite are used. As the most basic field, in a set $\{0, 1, 2, \ldots, p-1\}$ where p is a prime number, operation of these numbers is performed as in the operation of general natural numbers, and remainders divided by "p" are taken. That is, modular arithmetic is performed for $\{0, 1, 2, \ldots, p-1\}$ in GF(p). Hereinafter, such finite fields are called Boolean algebra ($Z_p$).

Generally, when there is a field as above, there may be an extension field of the field. The extension field is a field that is made by adding some new elements. Some examples of the extension field are rational numbers & real numbers and real numbers & complex numbers. When making such an extension field, the most natural and basic method is to think of a polynomial expression f(x) and add the root. For example, in real numbers, in a polynomial expression "$x^2+1=0$", there is no root in real numbers, so an imaginary number i is added, and an extension field, which is complex numbers, is obtained.

Likewise, when there is a field and a polynomial expression having the field's elements as coefficients, an extension field including all of the field's roots can be made. Also, when there is a certain finite field, the finite field is an extension field of $Z_p$ for a certain prime number p. Here, the value p is determined as a unique value. In other words, regardless of finite fields, some elements added to $Z_p$ still become a field. Further, any finite field becomes an extension field that has added only roots of a polynomial expression to elements of $Z_p x^{(p^n)} - x$ for a prime number p and a natural number n. The degree of the polynomial expression is $p^n$, and the total number of elements is $p^n$.

Hence, GF($2^8$) is an extension field that has added roots of the polynomial expression to Boolean algebra $Z_2 x^{2^8} - x$ and is a finite field whose number of elements is $2^8 = 256$.

As in the above theory, an arbitrary number of partial key ($S_i$) values which can generate normal decryption key of target content among data blocks of pilot content can be determined (determine n) using arbitrary f(x), and the portable terminal can then obtain the decryption key for the normal target content by more than the determined number (t) of partial keys ($S_i$).

Also, the packaging server can determine random prime number p for getting the polynomial expression f(x). The random prime number p determines a value that satisfies the following conditions of Equation 3.

$$p > \max(a_0, n) \quad (3)$$

As shown in Equation 3, the packaging server can determine a random prime number p that is larger than the value of any parameter which is a larger one among randomly-generated natural number $a_0$ and the total number (n) of the milestones. For example, if $a_0=10$ and n=7, random prime number p is determined as a number larger than 10, and if $a_0=5$ and n=9, random prime number is determined as a number larger than 9.

The packaging server next selects the coefficients of the polynomial expression f(x) as t−1 natural numbers where t−1 is smaller than the random prime number p, and the coefficients are defined as $a_1, a_2, \ldots, a_{t-1}$. Here, $a_0$ has been already generated in the above procedure, so it is omitted here. That is, the number of the coefficients of the polynomial expression f(x) becomes t by $a_0$ and the remaining t−1 coefficients.

The packaging server can obtain polynomial expression f(x) on Galois field GF(p) using the coefficients $a_0, a_1, a_2, \ldots, a_{t-1}$. Polynomial f(x) on the GF(p) can be obtained according to the following Equation 4.

$$f(x) = \sum_{j=0}^{t-1} a_j x^j = a_{t-1}x^{t-1} + a_{t-2}x^{t-2} + \ldots + a_2 x^2 + a_1 x + a_0 \qquad (4)$$

Also, the packaging server generates encryption key $(CEK_t)$ for encrypting the target content using the randomly-generated coefficient $(a_0)$. The encryption key $(CEK_t)$ for the target content can be generated according to the following Equation 5.

$$CEK_t = \text{Hash}_2(a_0) \qquad (5)$$

wherein $CEK_t$ represents an encryption key for encrypting the target content, $a_0$ represents the coefficient of polynomial expression f(x), a polynomial expression on GF(p), $\text{Hash}_2$ represents a hash function used to generate an encryption/decryption key for the target content. Here, the encryption key $CEK_t$ corresponds to a decryption key calculated for decryption of the target content in the portable terminal.

Further, the packaging server can generate and store parameters according to the threshold method. Then, the packaging server can generate packaging content according to the threshold method using the stored parameters. The operation of generating packaging content according to the threshold method is explained.

Referring to FIG. 8, the packaging server divides an advertisement content into an arbitrarily-set number of data blocks $b_1$ to $b_n$. Hereinafter, it is assumed that the set number is n (n is a natural number).

The packaging server selects milestones $m_1$ to $m_n$ 830 to be allocated to each data block $b_1$ to $b_n$ of the advertisement content. Here, the number of the selected milestones $m_1$ to $m_n$ may correspond to the number (n) of data blocks $b_1$ to $b_n$. Here, the packaging server determines a milestone for generating a set number of minimum partial keys among the milestones 830 according to the threshold method. Hereinafter, the partial key defined in the threshold method is called share (S).

That is, the packaging server draws the share $(S_i)$ and milestone $(m_i)$ values corresponding to each data block $b_1$ to $b_n$ of the advertisement content. The share $(S_i)$ and milestone $(m_i)$ can be calculated by the following Equation 6 and Equation 7, respectively.

$$S_i = f(i) \bmod p \ (1 \le i \le n) \qquad (6)$$

$$m_i = S_i \oplus \text{Hash}_1(b_i) \ (1 \le i \le n) \qquad (7)$$

Then, the packaging server randomly allots the milestones $m_1$ to $m_n$ 830 to each data block $b_1$ to $b_n$ of the advertisement content. FIG. 8 illustrates allotting the milestones in order, but the present invention is not limited to this, and the milestones can be randomly allocated in an arbitrary order.

Then, the packaging server calculates partial keys corresponding to the minimum number from each data block $b_1$ to $b_n$ of the advertisement content and the milestones allocated to each data block.

If the partial keys corresponding to the minimum number are $K_1$ to $K_n$, the partial keys can be calculated according to Equation 1 using the data blocks and milestones 830, or if the partial keys corresponding to the minimum number are an arbitrary number ($K_1$ to $K_p$), the arbitrary partial keys can calculate the partial keys corresponding to the arbitrary number ($K_1$ to $K_p$) based on the data blocks and the milestones 803 and Equation 1. That is, while in the all-or-nothing method, n partial keys corresponding to the number of the data blocks or milestones (n) are obtained, in the threshold method, p partial keys, which may be as many as or less than the number of the data blocks or milestones can be obtained.

The packaging server then encrypts the target content using the encryption key $(CEK_t)$ for the target content, which is produced by Equation 5. Here, the encryption process of the target content using the encryption key may be performed according to the standards (e.g., OMA-DRM 2x).

The packaging server randomly selects the encryption key $(CEK_p)$ for the pilot content for encrypting the advertisement content. The encryption key for the pilot content may generally be a public key having a 128 bit string. The packaging server encrypts the advertisement content using the encryption key $(CEK_p)$ for the pilot content, and generates the pilot content 810. The encryption process of the advertisement content using the encryption key $(CEK_p)$ for the pilot content can be performed according to the standards (e.g., OMA-DRM 2x).

The packaging server next generates packaging content using the pilot content and the target content as shown in FIG. 7. Additionally, the packaging server can encrypt the encryption key for the pilot content $(CEK_p)$ using the public key of the portable terminal, and can generate the final license for the packaging content including the encryption key for the pilot content $(CEK_p)$ and various sets of additional information. The encryption process using the public key of a server (e.g., packaging server, RI or the like) can be performed according to the standards (e.g., OMA-DRM 2x), and the additional information may include permissions and constraints or the like.

Detailed operation of a portable terminal of the present invention will now be explained with reference to FIGS. 9 to 12. However, the operation of the present invention is not limited to the examples described in the following, but can be applied to various embodiments based on the following embodiment.

Figure 9:
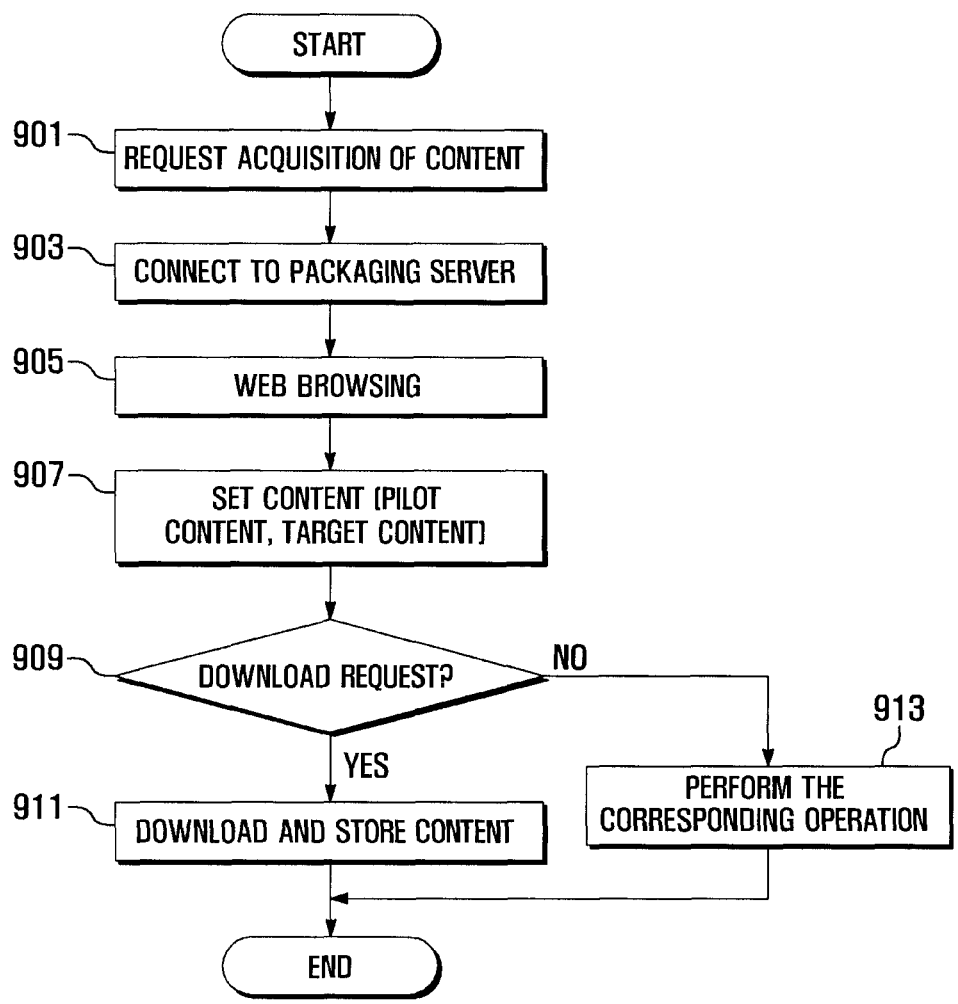
FIG. 9 is a flowchart illustrating a processing operation of a portable terminal according to an exemplary embodiment of the present invention.

FIG. 9 illustrates operation of processing in a portable terminal according to an exemplary embodiment of the present invention. FIG. 9 illustrates operation of requesting and downloading target content and pilot content corresponding to the user selection.

Referring to FIG. 9, a portable terminal senses a request to obtain content from a user (901), connects to a packaging server (903), and performs web browsing corresponding to the packaging server and the user's request (905). When the portable terminal is connected to the packaging server, the user can perform operations such as specifying pilot content and/or target content desired by the user though web browsing. The user can selectively specify one or more content among general content, pilot content, target content and packaging content.

When specifying the target content, the user can make a request for the target content, and here, the packaging server can randomly select the pilot content to be configured along with the target content. Also, the user can directly specify the pilot content for the packaging content.

Hence, the portable terminal can communicate with the packaging server the message that sets the content according to the user's selection through the web browsing (907).

The portable terminal checks whether the setting for the content has been completed and the downloading request is generated from the user (909). If the downloading request is not sensed, the portable terminal can perform the corresponding operation according to the user's request (913). The performance of the corresponding operation may include continuing the content setting of step 907, selecting a plurality of different content and terminating the connection to the packaging server.

On the other hand, if the downloading request is sensed, the portable terminal can download and store the corresponding content set at step 907 (911). When the downloading for the packaging content is sensed, the portable terminal can further perform the process of obtaining a free license (a public key) for the pilot content of the packaging content. In order to obtain the free license, the connection to the corresponding RI is made through the URL address of RI included in the packaging content. Also, the free license can be obtained from the packaging server when the packaging content are obtained.

Figure 10:
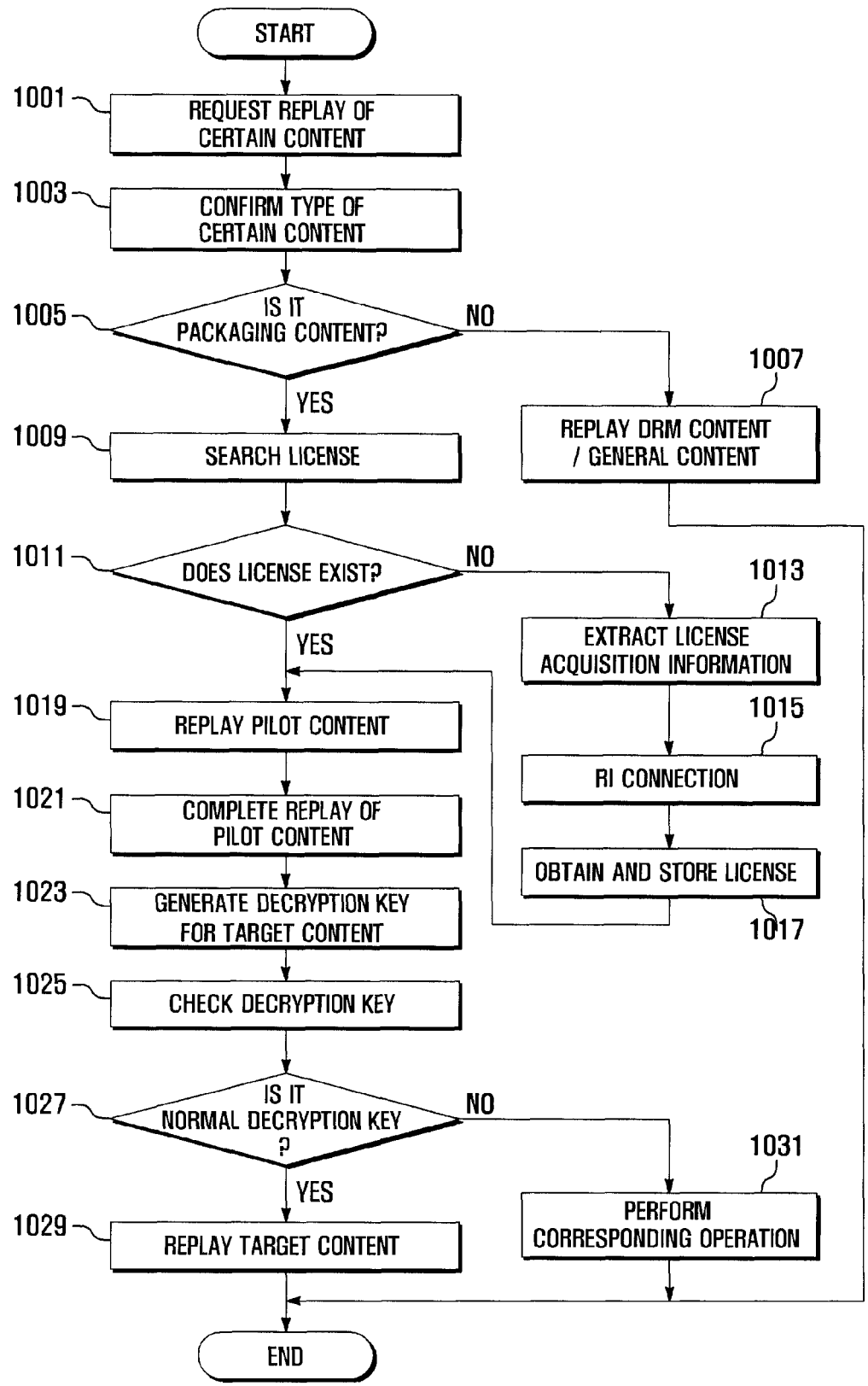
FIG. 10 is a flowchart illustrating a packaging content playing operation of a portable terminal according to an exemplary embodiment of the present invention.

FIG. 10 illustrates operation of playing packaging content in a portable terminal according to an exemplary embodiment of the present invention.

Referring to FIG. 10, if a portable terminal senses a request to playing content (1001), the type of the content can be checked (1003). That is, the portable terminal can check whether the content is a general content, a DRM content or a packaging content (1005). The content type can be confirmed according to the information included in the header of the corresponding content format. The case where the certain content is a packaging content will be representatively explained in the embodiment of FIG. 10.

If the type of the certain content is a general content or DRM content, the portable terminal can perform a playing operation for the corresponding content (1007). Such a playing operation corresponds to a well-know common technology, and especially, the playing of DRM content may be performed according to well known DRM standards (e.g., OMA-DRM 2x), so the detailed description of such a operation is not discussed herein.

If the type of the certain content is of a packaging content, the portable terminal can first perform the playing for the pilot content of the packaging content. At this time, the portable terminal searches for a license that is necessary for playing the pilot content (1009). Here, the license is a license which is used for decrypting the pilot content, and may be a free license corresponding to the public key as discussed previously. The license may correspond to a encryption key used when encrypting the advertisement content to form the pilot content.

The portable terminal can check whether a license corresponding to the pilot content exists by searching the license (1011). If the license does not exist, the portable terminal extracts the license acquisition information (1013) from the header information. As stated above, the license acquisition information may be the URL address of RI included in the header of the packaging content. The portable terminal next connects to the corresponding RI using the URL of the RI (1015), and obtains and stores the license for the pilot content from the RI (1017). After the acquisition of the license for the pilot content is completed, the portable terminal can perform the procedure of playing pilot content by the license (1019).

In contrast, if the license exists or the license is obtained according to step 1013 to step 1017, the portable terminal can play the pilot content (1019). Here, when playing the pilot content, the portable terminal can obtain at least one partial key by decryption of the pilot content. That is, the portable terminal can obtain the partial key for generating the decryption key for the target content of the packaging content by playing the pilot content. Specifically, when performing decryption according to the playing of the pilot content, the portable terminal can obtain each data block configuring the pilot content and a partial key from the milestones allocated to the data block, and perform buffering.

After the completion of the playing of the pilot content is sensed (1021), the portable terminal generates the decryption key for the target content using at least one partial key which is obtained and buffered according to the decryption of the pilot content (1023). The decryption key corresponds to the encryption key used when encrypting the target content in the packaging server. The encryption key may be an encryption key generated according to the encryption of the pilot content in the packaging server. The detailed description on the operation of generating the decryption key for the target content at step 1019 to step 1023 is described later. Here, completion of the playing of the pilot content may be the completion of the entire pilot content, completion of generation of a decryption key for the target content, or completion of the playing by the user's request.

The portable terminal checks the generated decryption key according to the set method (1025), and determines whether the decryption key for the target content is normal (1027). That is, it can be determined whether the decryption key has been generated by the user's illegal acts (skipping, fast forward, etc.).

If the generated decryption key is not a normal decryption key, the portable terminal can perform the set corresponding operation (1031). For example, the portable terminal can output a warning and a notice which informs of the fact that the decryption key for playing the target content is abnormal. Also, the portable terminal can disregard the playing of the target content after the playing of the pilot content, and can play the pilot content again, or the operation of playing the packaging content can be terminated. If the decryption key is abnormal, it may be the case that necessary conditions (lack of partial keys for generating a decryption key, etc.) for generating a decryption key for the target content are not satisfied as the user may have performed a skipping or a fast forward operation when playing the pilot content.

On the other hand, if the generated decryption key is a normal decryption key, the portable terminal plays the target content of the packaging content according to the decryption key obtained by having played of the pilot content (1029).

Figure 11:
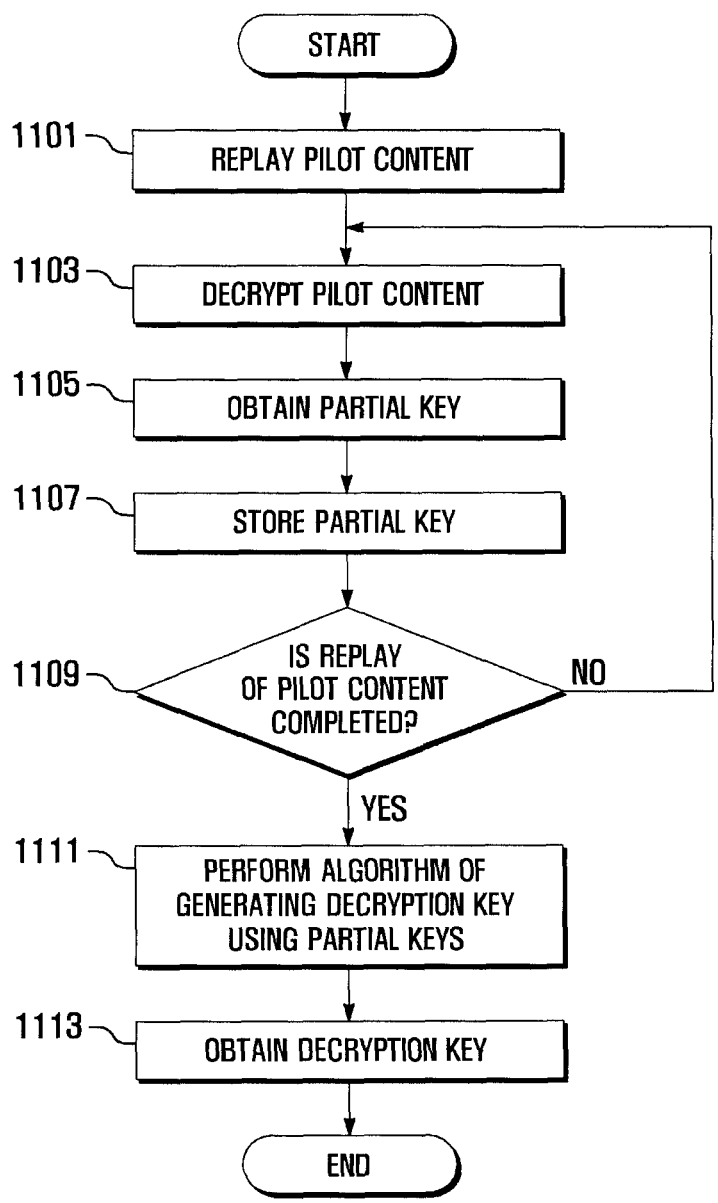
FIG. 11 is a flowchart illustrating a process of obtaining a decryption key for target content in a portable terminal according to an exemplary embodiment of the present invention.

FIG. 11 illustrates the process of obtaining the decryption key for the target content in a portable terminal according to an exemplary embodiment of the present invention.

Referring to FIG. 11, a portable terminal can first play the pilot content in response to the user's request of playing the packaging content (1101). The portable terminal can perform decryption in a manner that corresponds to encryption of the pilot content when playing the pilot content (1103).

Then, the portable terminal can obtain and buffer partial keys according to the data blocks of the pilot content and the allocated milestones by decryption of the pilot content (1105). At this time, the portable terminal can obtain partial keys according to the all-or-nothing method or the threshold method, and the detailed operation will explained later.

The portable terminal then stores the partial keys that are obtained and buffered (1107). Here, at least one partial key corresponding to the number of partial keys obtained according to the decryption is stored, and when a multiple of partial keys are obtained, the partial keys can be accumulated.

The portable terminal can check whether the playing of the pilot content has been completed while doing the above procedure (1109). Here, the completion of the pilot content may be the completion of the playing of the entire pilot content, completion of generation of a decryption key for the target content, or completion of the playing by the user's request.

Then, if the completion of the playing of the pilot content is sensed, the portable terminal performs the algorithm for generating the decryption key for the target content using the at least one obtained partial key (1111), and by which the decryption key for the target content is obtained (1113). Thereafter, the portable terminal determines whether the obtained decryption key is normal, and if the decryption key is normal, can play the target content using the decryption key.

A method of obtaining the decryption key for the target content corresponding to the all-or-nothing method or the threshold method in the portable terminal from the pilot content is now described.

The portable terminal obtains a free license corresponding to the pilot content of the packaging content according to the user's selection. Hereinafter, the free license is called a public key ($CEK_p$) for playing the pilot content. The method of obtaining the public key ($CEK_p$) may be performed according to the standards (e.g., OMA-DRM 2x), and its detailed description is omitted here.

Then, if the request to playing the packaging content or the request to playing the target content of the packaging content is sensed in response to the user's request, the portable terminal first plays the pilot content using the public key ($CEK_p$).

Here, the portable terminal may obtain the decryption key for the target content when playing the pilot content. Referring to FIG. 8, the portable terminal decrypts the first data block ($b_1$) of the pilot content using the public key ($CEK_p$), and reads the value of the milestone ($m_1$) mapped to the first data block ($b_1$) when the first data block ($b_1$) is played. Also, the portable terminal calculates the first partial key ($K_1$) by the milestone and temporarily stores the first partial key ($K_1$). The partial key ($K_1$) can be calculated by the following Equation 8.

$$K_1 = Hash_1(b_1) \oplus m_1 \qquad (8)$$

where, $K_1$ represents a first partial key calculated from the first data block ($b_1$) of the pilot content and the first milestone ($m_1$) mapped to the first data block, and $b_1$ represents the first data block of the pilot content, $m_1$ represents the first milestone corresponding to the first data block, and $Hash_1$ represents a hash function used for decrypting data block of the pilot content.

The portable terminal can then perform the process of obtaining the partial key until the playing of the pilot content is completed. Hence, the portable terminal can calculate the second ($2^{nd}$) to $n^{th}$ partial key based on Equation 8. This can be expressed by the Equation 1, wherein i=1. That is, the decryption key may be determined by the portable terminal by using a process for decryption similar to that corresponding to the process of encryption of the advertisement content to obtain the pilot content.

After the first partial key ($K_1$) to the $n^{th}$ partial key ($K_n$) are obtained according to Equation 1, the portable terminal generates the decryption key ($CEK_t$) for the target content from the first partial key ($K_1$) to the $n^{th}$ partial key ($K_n$). The decryption key can correspond to the decryption key generated by the above partial keys in the above-described packaging server. Hence, the decryption key ($CEK_t$) can be generated in a process according to Equation 2. Here, in Equation 2, $CEK_t$ can be referred to as a decryption key for decrypting the target content.

The portable terminal can then decrypt target content using the generated decryption key ($CEK_t$), and thus generates the target content by the decryption. Moreover, after the target content is played according to the above-described procedure, the portable terminal can discard the decryption key or proceed with the additional DRM processing. For example, the decryption key for the target content may be a temporary decryption key generated by playing the pilot content, and thus when the playing of the target content by the temporary decryption key is completed, the temporary decryption key can be discarded.

Until now, the operation of obtaining the decryption key for the target content when playing the packaging content according to the all-or-nothing method aspect of the invention has been considered. The operation of obtaining the decryption key for the target content when playing the packaging content according to the threshold method aspect of the invention will now be considered.

In this aspect of the invention, the portable terminal obtains a free license corresponding to the pilot content of the packaging content according to the user's selection. Hereinafter, the free license is called a public key ($CEK_p$) for playing the pilot content. The method of obtaining the public key ($CEK_p$) may be performed according to the standards (e.g., OMA-DRM 2x), and its detailed description is omitted here.

If the request to playing the packaging content or the request to playing the target content of the packaging content is sensed in response to the user's request, the portable terminal first plays the pilot content according to the public key ($CEK_p$).

At this time, the portable terminal can obtain the decryption key for the target content when playing the pilot content. Referring to FIG. 8, the portable terminal decrypts the first data block ($b_1$) of the pilot content using the first public key ($CEK_p$), and reads the value of the milestone ($m_1$) mapped to the first data block when the first data block is played. Also, the portable terminal calculates the first share ($S_1$) by the milestone and temporarily stores the first share.

The portable terminal can calculate each share ($S_i$) corresponding to each milestone ($m_i$) by the application of the Equation 7 corresponding to the operation of the packaging server. Each share ($S_i$) according to each milestone ($m_i$) can be calculated by the following Equation 9.

$$S_i = m_i \oplus Hash_1(b_i) \qquad (9)$$

First, the user can play only a portion of the pilot content according to the threshold method. For example, the playing can be done while skipping the target content by the fast forward or the like. Hereinafter, it is assumed that there are t data blocks of the target content decrypted according to the method of playing the target content by the user, and there are t data blocks played as a minimum for generating the decryption key for the target content. If less than t data blocks are decrypted, a normal decryption key is not generated and the playing of the target content is not performed.

Specifically, when the playing of the pilot content is completed, the portable terminal can determine the number of decrypted data blocks of the pilot content. That is, the portable terminal calculates each share ($S_1, S_2, S_t$) by Equation 9 using the decrypted data blocks and the milestones mapped to the data blocks. Here, each share can be calculated in accordance with "t", the number of milestones or data blocks played by the user. After that, the portable terminal calculates the coefficient ($a_0$) for generating the decryption key for the target content by each calculated share ($S_1, S_2, \ldots, S_t$). The coefficient ($a_0$) can be calculated by the following Equation 10.

$$a_0 = \sum_{j=1}^{t} y_j \prod_{i \le k \le t, k \ne j} \frac{x_k}{x_k - x_j} \qquad (10)$$

wherein parameters x and y correspond to i and share ($S_i$) of Equation 9, respectively.

That is, it can be expressed as (x, y)=(i, $S_i$). For example, if t=3, ($x_1$, $y_1$), ($x_2$, $y_2$) and ($x_3$, $y_3$) are substituted to Equation 10, the coefficient ($a_0$) can be calculated as the following.

$$a_0 = y_1\left(\frac{x_2}{x_2-x_1} \cdot \frac{x_3}{x_3-x_1}\right) + y_2\left(\frac{x_1}{x_1-x_2} \cdot \frac{x_3}{x_3-x_2}\right) + y_3\left(\frac{x_1}{x_1-x_3} \cdot \frac{x_2}{x_2-x_3}\right) \quad (11)$$

Here, if ($x_1$, $y_1$)=(1, 3), ($x_2$, $y_2$)=(2, 5) and ($x_3$, $y_3$)=(3, 10) the coefficient $a_0$ becomes 4.

The portable terminal generates a decryption key ($CEK_t$), which is a license for the target content using the calculated coefficient. The decryption key can correspond to the encryption key generated by the random coefficient in the packaging server. Here, the coefficient ($a_0$) can be generated using t data blocks and t milestones of the pilot content corresponding to the set number (t) as stated above. Hence, the calculation formula for generating the decryption key for the target content can be defined as the above Equation 5. In the above Equation 5, however, $CEK_t$ can be called a decryption key for decrypting the target content.

The portable terminal can decrypt the target content using the generated decryption key ($CEK_t$), and thus can generate the target content. Moreover, after the target content is played according to the above-stated procedure, the portable terminal can discard the decryption key or can proceed with additional DRM processing. For example, the decryption key for the target content may be a temporary decryption key generated by the playing of the pilot content, and thus when the playing of the target content by the temporary decryption key is completed, the temporary decryption key can be discarded.

Until now, the method of generating packaging content and playing the packaging content according to the all-or-nothing method and the threshold method of the present invention have been considered. However, the present invention can also be applied to other application methods (e.g., extension method) based on the all-or-nothing method and the threshold method. Hereinafter, other application methods will be described.

That is, the methods explained above have been designed in such a manner that the number of milestones is the same as the number of data blocks of the pilot content. In other words, the operation has been explained assuming n data blocks and n milestones. Here, if "n" is a large number, a large amount of operation may be required in restoring partial keys, which would not be appropriate for a system of limited performance.

Also, on the position of the advertisement provider, it might be more important for the user to view or listen to a certain part of the advertisement, not the entire advertisement. That is, it is important how well and effectively the message intended to be transmitted by the advertisement has been recognized in the long-term memory of the user, which stimulates associations more effectively when the clients buy the product. Such a study is the focus of the ad-recognition/ad-awareness or ad-tracking field of the advertisement marketing.

Hence, even though the number milestones of the pilot content is set to the number less than the number of the data blocks, and the milestones are positioned randomly, it is possible to have a more efficient system while realizing the ultimate goal of the present invention. In such a case, it is possible to add information on the number and positions of milestones, and what data blocks and logic operation (e.g., exclusive logic sum, XOR) will be taken.

Hereinafter, when the portable terminal uses packaging content, in case the playing information is counted when the pilot content are played and the playing of the pilot content is done more than the set conditions, an embodiment of freeing the playing on the target content without the playing of the pilot content will be explained with reference FIG. 12.

FIG. 12 illustrates operation of playing packaging content of a portable terminal according to an exemplary embodiment of the present invention.

Referring to FIG. 12, when a portable terminal senses a request to playing packaging content (1201), the portable terminal checks playing information on the packaging content in response to the request (1203). The portable terminal next determines whether the decryption key for the target content of the packaging content exists based on the playing information (1203).

If the decryption key exists, the portable terminal skips the playing of the pilot content (1205), and plays the target content by the decryption key (1207). At this time, the portable terminal can also play the pilot content in response to the user's request.

If the decryption key does not exist, the portable terminal plays the pilot content (1209). Moreover, the portable terminal obtains a partial key through the decryption of each data block of the pilot content when playing the pilot content (1211). Then, when the playing of the pilot content is completed (1213), the portable terminal obtains a temporary decryption key for the target content using partial keys obtained by the decryption (1215).

Then, the portable terminal checks the temporary decryption key according to a predetermined method, and determines whether the temporary decryption key is normal (1217). At this time, if the obtained temporary decryption key is not a normal decryption key, the portable terminal can perform predetermined operations (1219). For example, the portable terminal can inform a user that the target content cannot be played because the obtained temporary decryption key has been obtained by an abnormal operation, and can play the pilot content again or can terminate the playing process. Such an abnormal operation may be an operation in case the conditions for generating the decryption key are not satisfied. For example, if a user were to skip or fast forward through the pilot content, then all the partial keys may not be obtained.

On the other hand, if the obtained temporary decryption key is a normal decryption key, the portable terminal checks playing conditions for the pilot content (1221). The playing conditions refer to conditions such as the number of times of normal playing procedures for the pilot content and the time.

Then, the portable terminal counts playing information of the played pilot content, and determines whether the playing information of the pilot content satisfies the playing conditions (1223). That is, when a normal decryption key is obtained according to the playing of the pilot content, the portable terminal can determine whether the playing of the pilot content according to the acquisition of the normal decryption key satisfies the above conditions.

For example, when the playing conditions are set to 10 times of playing conditions, the comparison can be made with the number of times of the playing the pilot content. Then based on the comparison, it can be distinguished whether the playing of the pilot content is the $10^{th}$ playing. Hence, when the pilot content is normally played, the number of time of playing the pilot content can accumulated. Eventually, the portable terminal can determine whether the conditions are satisfied by comparing the accumulated playing information with the playing conditions.

Then, if the conditions are satisfied, the portable terminal plays the target content using the temporary decryption key (1225) obtained from the pilot content. Then when the playing of the target content by the temporary decryption key is completed (1227), the portable terminal stores the temporary decryption key as a normal decryption key (1229). Hence, the portable terminal can then determine whether there is the decryption key of step 1203 by the stored decryption key.

Then, if the conditions are not satisfied, the portable terminal updates playing information for the pilot content (1231). That is, the playing information can be accumulated to the previous playing information. The portable terminal then plays the target content by the temporal decryption key (1233). Thereafter, when the playing of the target content by the temporary decryption key is completed (1235), the portable terminal discards the temporary key (1237). That is, the decryption key obtained and temporarily stored by the playing of the pilot content is removed from the portable terminal.

By the process shown in FIG. 12, when the normal viewing (listening) of the pilot content more than the set conditions is done, the user can skip viewing (listening) the pilot content later, and thus the playing on the target content can be directly performed depending on the user's desire.

Further, as explained in the decryption with reference to FIGS. 1 to 12, the determination of whether the decryption key for the target content is normal shows an example of the case where an illegal playing for the pilot content by the user's abnormal acts is determined, which prevents the playing of the target content if the normal viewing (listening) is not achieved by the user's skipping when the pilot content are played.

However, even though the user performs normal viewing (listening) on the pilot content, a valid decryption key may not be generated. For example, in case data is lost in a certain data block of pilot content while data is being transmitted, even though the portable terminal draws a decryption key according to the playing of the pilot content, the decryption key becomes invalid. Hence, it is impossible to play the target content using the decryption key, and there is a chance that the target content cannot be played even though the user has properly viewed or listened pilot content. As such, an embodiment of the present invention suggests a method of checking whether the decryption key is valid. That is, for the decryption key for the target content generated according to the playing of the pilot content, the process of determining validity of the decryption key as well as the determination of whether the decryption key has been normally generated by the user can be made. The process of determining validity of the decryption key will be explained in the following.

The determination of validity of the decryption key of the present invention explained in the following can be applied to any of the all-or-nothing method, and the threshold method. It would be recognized that the present invention can also be applied to other application methods (e.g., extension method) based on the all-or-nothing method and the threshold method.

First, a key-hash value, which becomes a standard for authenticating a decryption key for target content in a portable terminal when generating packaging content, can be generated in a packaging server. The key-hash value can be generated using an encryption key ($CEK_t$) for target content generated by the pilot content of the packaging content, which can be expressed as $$\text{Key-Hash} = \text{Hash}(CEK_t) \qquad (12)$$

The packaging server can include the key-hash value as part of the data format of the packaging content or can store the key-hash value in the corresponding license.

Then, when receiving packaging content, the portable terminal can generate a decryption key for target content by decryption of the pilot content. At this time, the generation process can be internally performed by the portable terminal at the time point when the packaging content are obtained. Then the portable terminal determines whether the generated decryption key is valid using the generated decryption key and the key-hash value included in the packaging content or the corresponding license. That is, it can be determined whether the generated decryption key and the key-hash value are the same.

Assuming that the decryption key is C, the determination of the validity, i.e., the authentication of the decryption key C, can be expressed as $$\text{Key-Hash} = ?\text{Hash}(C) \qquad (13)$$

Then, by the above comparison, if the decryption key (C) and the key-hash value are the same, the portable terminal can determine that the decryption key is a valid decryption key which can play target content. After that, when packaging content of the user are played, the portable terminal can determine whether the decryption key generated according to the playing state of the pilot content is normal, and can play the target content in accordance with the determination.

If, however, the decryption key (C) and the key-hash value are not the same by the comparison, the portable terminal can determine that the decryption key is an invalid decryption key. In such a case, even though the user normally views or listens to the pilot content, as an incomplete decryption key is generated, the target content cannot be played because of the abnormal decryption key.

Hence, the portable terminal can consider the pilot content to have been lost while transmitted, reconnect to an advertisement server or a packaging server, and download the pilot content again. At this time, URL for re-downloading the pilot content can be included in the packaging content header.

Further, as an application of the present invention, a service selection right for viewing or listening to pilot content can be granted to the user. For example, as various services like Table 1 are provided, the selection right by the use of the packaging content can be granted, thereby giving more convenience to the user.

TABLE 1

| Service type | Remarks |
|---|---|
| Entire playing of pilot content | Free (Entirely free) |
| Partial playing of pilot content | Charged/discounted (partially charged) |
| No pilot content | Charged (Entirely charged) |

As shown in Table 1, when configuring the packaging content, the user can obtain the license of the target content by viewing or listening to the desired pilot content for free, can obtain the license of the target content by viewing or listening to a portion of pilot content by paying a discounted fee, or can purchase the license for DRM content without viewing or listening to the pilot content.

As described above, according to a method and system for providing a digital content service, in case a user views (listens to) the entire (all-or-nothing method) or a portion of (threshold method) advertisement content, the user can obtain a decryption key for DRM content. As such, the user can use DRM content for free by viewing advertisements, and by preventing the user's arbitrary skipping or the like of advertisement data (video, audio, etc.), advertisers can expect more assured advertisement effects and account collection.

According to the present invention, since additional content can be executed only when a consumer views (or listens to) a certain advertisement, a consumer can have an attractive alternative in an economic sense. That is, the license purchasing costs for playing DRM content can be reduced or substituted by viewing (listening to) advertisements of tens of seconds. Also, more convenience is given to the user because a service selection right for viewing (listening to) advertisement content is given to the user. That is, various extended methods of services such as <advertisement content (entire)+DRM content=free>, <advertisement content (a portion)+DRM content=discounted>, <advertisement content (none)+DRM content=charged> may be provided, so the user has various selection choices.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Further, according to the present invention, the user cannot disregard the advertisements, so the user's concentration level on the advertisements would go up, thereby satisfying the advertiser's requirements and improving advertisement effects.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

It would further be understood that statements indicating that certain expressions and the reference signs of Rule 6.2(b) PCT used in the claims are provided to illustrate aspects of the invention and are not intended to not limit the scope of the invention claimed.

What is claimed is:

1. A method for providing content service in a portable terminal, the method comprising:
    receiving packaging content including pilot content and target content, the target content being encrypted using an encryption key based on the pilot content;
    playing the received pilot content when playing of the packaging content is requested;
    decrypting each of a plurality of data blocks configuring the pilot content when playing the pilot content;
    obtaining a plurality of partial keys corresponding to the data blocks through the decryption of the data blocks;
    generating a decryption key for the target content using the plurality of partial keys obtained by the decryption; and
    playing the target content of the packaging content using the decryption key.

2. The method of claim 1, wherein the packaging content comprises a header, the header includes identification information for identifying the packaging content, information for granting priorities to the playing of the pilot content, and address information for obtaining a public key for playing the pilot content.

3. The method of claim 2, wherein playing the received pilot content comprises:
    searching for the public key used for playing of the pilot content;
    extracting address information for obtaining the public key when the public key does not exist;
    obtaining the public key for the pilot content by the address information; and
    playing the pilot content using the public key.

4. The method of claim 1, wherein generating the decryption key includes obtaining each of the plurality of partial keys from a respective one of the data blocks configuring the pilot content and a respective milestone allocated to the respective one of the data blocks when playing the pilot content,
    wherein the plurality of partial keys are obtained in a manner that corresponds to a number of the data blocks or a number of the milestones.

5. The method of claim 4, wherein obtaining the plurality of partial keys comprises
    obtaining a first partial key of a first data block to an $n^{th}$ partial key of an $n^{th}$ data block, and the decryption key for the target content is generated from the first partial key to the $n^{th}$ partial key.

6. The method of claim 1, further comprising:
    determining whether the decryption key generated by the plurality of partial keys is normal;
    omitting the playing of the target content when the decryption key is not normal; and
    playing the target content using the decryption key when the decryption key is normal.

7. The method of claim 6, further comprising:
    incrementing a count for a number of times the pilot content is played when the decryption key is a normal decryption key;
    determining whether playing conditions are satisfied by comparing the count with playing conditions obtained from the pilot content;
    replaying the target content using the decryption key when the playing conditions are satisfied; and
    storing the decryption key as a normal decryption key for the target content when the playing of the target content by the decryption key is completed, wherein the playing conditions comprise number of times of normal playing for the pilot content.

8. The method of claim 7, further comprising:
    playing the target content using the decryption key when the playing conditions are not satisfied; and
    discarding the decryption key used for playing of the target content when the playing of the target content by the decryption key is completed.

9. The method of claim 7, further comprising:
    determining whether the stored decryption key for the target content of the packaging content exists in response to request of playing the packaging content;
    skipping the playing of the pilot content when the stored decryption key exists; and
    playing the target content by the stored decryption key.

10. The method of claim 1, further comprising:
authenticating the decryption key by comparing the decryption key with authentication information included in the packaging content;
determining validity of the decryption key when the decryption key is identical with the authentication information; and
re-downloading the pilot content by obtained address information of the pilot content when the decryption key is invalid.

11. The method of claim 1, wherein generating the decryption key for target content comprises at least one of:
obtaining the decryption key of the target content without fee, by playing the pilot content; and
obtaining the decryption key of the target content at a discounted fee, by playing only a portion of the pilot content.

12. The method of claim 1, wherein the target content is played following completion of playing the pilot content, the completion of the pilot content comprises completion of playing of the entire pilot content, completion of generation of a decryption key for the target content, or completion of the playing by the user's request.

13. A method for providing content service in a packaging server, the method comprising:
selecting, by a portable terminal, pilot content and target content to configure the packaging content;
classifying the pilot content into a preset number of data blocks;
allocating a milestone for each of the data blocks;
calculating a plurality of partial keys from the data blocks and the allocated milestones;
generating an encryption key for encrypting the target content using the plurality of partial keys;
encrypting the target content using the encryption key; and
generating packaging content using the pilot content and the target content.

14. The method of claim 13, further comprising:
selecting a public key for encryption of the pilot content; and;
encrypting the pilot content using the public key.

15. The method of claim 13, wherein calculating a plurality of partial keys comprises calculating a number of partial keys equaling the preset number of data blocks.

16. The method of claim 14, wherein the packaging content comprises a header, wherein the header comprises identification information for identifying the packaging content, information for granting priorities to the playing of the pilot content, and address information for obtaining the public key of the pilot content.

17. The method of claim 14, wherein encrypting the target content comprises:
determining an encryption type for encrypting the target content,
wherein the encryption type is one of an all-or-nothing type for which a decryption key is obtainable for the target content requiring playing all of pilot content, and a threshold type for which a decryption key is obtainable for the target content requiring playing a part of the pilot content.

18. The method of claim 16, wherein the packaging content includes authentication information for determining validity of a decryption key for target content and address information for downloading the pilot content.

19. The method of claim 13, wherein the packaging server configures the packaging content by using the target content and the pilot content selected by the portable terminal.

20. The method of claim 13, wherein the packaging server configures the packaging content by using the target content selected by the portable terminal and the pilot content obtained from an advertisement server.

21. The method of claim 13, wherein a free portion of the target content is provided according to a portion of a decryption key corresponding to a played portion of the pilot content, and further comprising:
providing a remaining portion of the decryption key of the target content according to a payment for a remaining portion of the target content with a discounted fee.

22. A portable terminal for providing a content service, comprising:
receiver which receives a packaging content including pilot content and target content, the target content being encrypted using an encryption key based on the pilot content, the pilot content being comprised of a plurality of data blocks;
storage which stores the packaging content; and
processor which decrypts each of the data blocks of the pilot content when playing the pilot content, obtains a plurality of partial keys corresponding to the data blocks through decryption of the data blocks, generates a decryption key for the target content using the plurality of partial keys obtained by the decryption when the playing of the pilot content is completed, and plays the target content of the packaging content using the decryption key.

23. The portable terminal of claim 22, wherein the portable terminal increments a count for a number of times that the pilot content is played when the decryption key is a normal decryption key generated by the normal playing of the pilot content, compares the count with playing conditions obtained from the pilot content, plays the target content using the decryption key when the playing conditions are satisfied, and stores the decryption key as a normal decryption key for the target content when the playing of the target content by the decryption key is completed,
wherein the playing conditions comprise number of times of normal playing of the pilot content.

24. The portable terminal of claim 23, wherein the portable terminal obtains a public key for playing the pilot content by address information for obtaining the public key, and plays the pilot content first utilizing the obtained public key.

25. The portable terminal of claim 24, wherein the portable terminal obtains each of the plurality of partial keys from each of the data blocks configuring the pilot content and a milestone allocated to each of the data blocks when playing the pilot content,
wherein the plurality of partial keys is obtained in a manner that corresponds to a number of the data blocks or a number of the milestones.

26. A server for providing a content service, comprising:
a packaging server which generates packaging content including pilot content and target content selected from a portable terminal, and provides the generated packaging content to the portable terminal,
wherein the packaging server classifies the pilot content into a preset number of data blocks, allocates a milestone for each of the data blocks, calculates a plurality of partial keys from the data blocks and the allocated milestones, generates an encryption key for encrypting the target content using the plurality of partial keys, encrypts the target content using the encryption key, and generates the packaging content comprising the pilot content and encrypted target content.

27. The server of claim 26, wherein the packaging server encrypts the pilot content using a public key.

28. The server of claim 27, wherein the packaging content comprises a header, wherein the header comprises identification information for identifying the packaging content, information for granting priorities to playing of the pilot content, and address information for obtaining the public key.

29. A system for providing a content service, the system comprising:

a packaging server which selects pilot content and target content to configure packaging content, classifies the pilot content into a preset number of data blocks, allocates a milestone for each of the data blocks, calculates a plurality of partial keys from the data blocks and the allocated milestones, generates an encryption key for encrypting the target content using the plurality of partial keys, encrypts the target content using the encryption key, generates the packaging content comprising encrypted pilot content and the encrypted target content, and provides the generated packaging content to a portable terminal; and the portable terminal which receives the packaging content, decrypts the data blocks configuring the pilot content when playing the pilot content, obtains the plurality of partial keys corresponding to the data blocks through decryption of the data blocks, generates a decryption key for the target content using the plurality of partial keys obtained by the decryption when the playing of the pilot content is completed, and plays the target content of the packaging content using the decryption key.

30. The system of claim 29, wherein the packaging server transmits the packaging content which further includes authentication information for determining validity of the decryption key and address information for downloading the pilot content in the packaging content; and the portable terminal determines validity of the decryption key when the decryption key is identical with the authentication information, and downloads the pilot content again using the address information if the decryption key is invalid.

* * * * *

UNITED STATES PATENT AND TRADEMARK OFFICE
CERTIFICATE OF CORRECTION

| | |
|---|---|
| PATENT NO. | : 8,619,994 B2 |
| APPLICATION NO. | : 12/625825 |
| DATED | : December 31, 2013 |
| INVENTOR(S) | : Lee et al. |

It is certified that error appears in the above-identified patent and that said Letters Patent is hereby corrected as shown below:

In the Claims

Column 27, Claim 12, Lines 20-21 should read as follows:
--...of the playing of entire...--

Signed and Sealed this
Twenty-fifth Day of March, 2014

Michelle K. Lee
*Deputy Director of the United States Patent and Trademark Office*